United States Patent
Pelley et al.

(10) Patent No.: US 9,094,135 B2
(45) Date of Patent: Jul. 28, 2015

(54) DIE STACK WITH OPTICAL TSVS

(71) Applicant: Freescale Semiconductor, Inc., Austin, TX (US)

(72) Inventors: Perry H. Pelley, Austin, TX (US); Tab A. Stephens, Austin, TX (US); Michael B. McShane, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 231 days.

(21) Appl. No.: 13/914,021

(22) Filed: Jun. 10, 2013

(65) Prior Publication Data

US 2014/0363172 A1    Dec. 11, 2014

(51) Int. Cl.
| | |
|---|---|
| *G02B 6/26* | (2006.01) |
| *H04B 10/80* | (2013.01) |
| *G02B 6/12* | (2006.01) |
| *G02B 6/35* | (2006.01) |

(52) U.S. Cl.
CPC .......... *H04B 10/801* (2013.01); *G02B 6/12002* (2013.01); *G02B 6/3556* (2013.01)

(58) Field of Classification Search
CPC ............. G02B 6/12002; G02B 6/3556; G02B 6/3554; G02B 6/3546; G02B 6/3544; G02B 6/12; H04B 10/801
See application file for complete search history.

(56) References Cited

U.S. PATENT DOCUMENTS

| | | | |
|---|---|---|---|
| 4,653,850 A * | 3/1987 | Boirat et al. ................ | 385/17 |
| 4,828,358 A | 5/1989 | Blonder | |
| 5,020,871 A * | 6/1991 | Nishimura .................. | 385/24 |
| 5,483,174 A | 1/1996 | Hembree et al. | |
| 5,534,784 A | 7/1996 | Lum et al. | |
| 5,631,571 A | 5/1997 | Spaziani et al. | |
| 5,963,554 A * | 10/1999 | Song ....................... | 370/395.1 |
| 6,325,553 B1 | 12/2001 | Deacon et al. | |
| 6,335,224 B1 | 1/2002 | Peterson et al. | |
| 6,417,107 B1 | 7/2002 | Sekimura | |

(Continued)

FOREIGN PATENT DOCUMENTS

| | | |
|---|---|---|
| EP | 1172680 A2 | 1/2002 |
| WO | 2006136194 A1 | 12/2006 |

OTHER PUBLICATIONS

Shen, Po-Kuan, et al., "SOI-based trapezoidal waveguide with 45-degree microreflector for non-coplanar light bending", Silicon Photonics VII, Proceedings of SPIE, vol. 8266, Feb. 9, 2012, pp. 1-7.

(Continued)

*Primary Examiner* — Rhonda Peace
(74) *Attorney, Agent, or Firm* — Terrile, Cannatti, Chambers & Holland, LLP; Michael Rocco Cannatti

(57) ABSTRACT

A high density, low power, high performance information system, method and apparatus are described in which a laser source (213) on a first die (210) generates a source light beam of unmodulated monochromatic coherent light (281) for distribution via optical beam routing structures (e.g., 214/214*a*, 224/224*a*, 234/234*a*) to a plurality of receiving die (220, 230), each of which includes its own modulator (e.g., 223, 233) for optically receiving at least a portion of the source light beam (281*a*, 281*b*) from the first die and generating therefrom an output source light beam of modulated monochromatic coherent light (291, 292) which is encoded at said modulator in response to electrical signal information.

20 Claims, 14 Drawing Sheets

(56) References Cited

U.S. PATENT DOCUMENTS

| | | | |
|---|---|---|---|
| 6,477,303 B1 | 11/2002 | Witherspoon | |
| 6,556,285 B1 | 4/2003 | Dickson | |
| 6,650,810 B1 | 11/2003 | Lieberman et al. | |
| 6,686,993 B1 | 2/2004 | Karpman et al. | |
| 6,690,845 B1 | 2/2004 | Yoshimura et al. | |
| 6,753,037 B2 | 6/2004 | Miller et al. | |
| 6,765,396 B2 | 7/2004 | Barror | |
| 6,813,584 B2 | 11/2004 | Zhou et al. | |
| 6,850,081 B1 | 2/2005 | Birdsley et al. | |
| 6,897,663 B1 | 5/2005 | Conn | |
| 6,909,830 B2 | 6/2005 | Lee et al. | |
| 6,936,491 B2 | 8/2005 | Partridge et al. | |
| 6,950,570 B1 | 9/2005 | Novotny | |
| 6,999,651 B2 | 2/2006 | Qian et al. | |
| 7,016,564 B1 | 3/2006 | Graves | |
| 7,020,363 B2 | 3/2006 | Johannessen | |
| 7,042,563 B2 | 5/2006 | Wilsher et al. | |
| 7,071,025 B2 | 7/2006 | Brenner et al. | |
| 7,183,759 B1 | 2/2007 | Malendevich et al. | |
| 7,215,845 B1* | 5/2007 | Chan et al. | 385/24 |
| 7,224,174 B1 | 5/2007 | Malendevich et al. | |
| 7,271,461 B2* | 9/2007 | Dutta | 257/432 |
| 7,298,536 B2 | 11/2007 | McCann et al. | |
| 7,379,191 B2 | 5/2008 | Brooks | |
| 7,427,868 B2 | 9/2008 | Strid et al. | |
| 7,440,449 B2* | 10/2008 | Carson et al. | 370/386 |
| 7,444,042 B1 | 10/2008 | Niblock et al. | |
| 7,474,420 B2 | 1/2009 | Li et al. | |
| 7,532,785 B1* | 5/2009 | Beausoleil et al. | 385/14 |
| 7,586,608 B1 | 9/2009 | Gunn, III et al. | |
| 7,612,737 B2 | 11/2009 | Bright et al. | |
| 7,664,349 B2 | 2/2010 | Holmstrom et al. | |
| 7,824,945 B2 | 11/2010 | Chang et al. | |
| RE42,124 E | 2/2011 | Riza | |
| 7,982,765 B2 | 7/2011 | Lewis et al. | |
| 8,004,080 B2 | 8/2011 | McShane et al. | |
| 8,014,682 B2 | 9/2011 | Pelley et al. | |
| 8,032,030 B2 | 10/2011 | Pessoa et al. | |
| 8,058,137 B1* | 11/2011 | Or-Bach et al. | 438/401 |
| 8,064,739 B2 | 11/2011 | Binkert et al. | |
| 8,218,917 B2 | 7/2012 | Sano et al. | |
| 8,260,151 B2 | 9/2012 | Pelley et al. | |
| 8,319,230 B1* | 11/2012 | Dutta | 257/82 |
| 8,749,772 B2 | 6/2014 | Busico et al. | |
| 8,750,660 B2 | 6/2014 | Levy et al. | |
| 8,766,284 B1* | 7/2014 | Dutta | 257/82 |
| 8,859,394 B2* | 10/2014 | Dallesasse et al. | 438/458 |
| 8,916,874 B2 | 12/2014 | Whitbread et al. | |
| 2002/0012744 A1 | 1/2002 | Miller et al. | |
| 2002/0028045 A1* | 3/2002 | Yoshimura et al. | 385/50 |
| 2002/0132389 A1 | 9/2002 | Patel et al. | |
| 2003/0017640 A1* | 1/2003 | Foley Barenburg et al. | 438/50 |
| 2003/0026517 A1* | 2/2003 | Shimoda | 385/14 |
| 2003/0043289 A1 | 3/2003 | Konno | |
| 2003/0161573 A1* | 8/2003 | Ishida et al. | 385/14 |
| 2003/0199109 A1 | 10/2003 | Kuzma | |
| 2004/0013359 A1 | 1/2004 | Lee et al. | |
| 2004/0027644 A1* | 2/2004 | Fazi, Jr. | 359/298 |
| 2004/0036170 A1 | 2/2004 | Lee et al. | |
| 2004/0071387 A1* | 4/2004 | Mule et al. | 385/14 |
| 2004/0081402 A1* | 4/2004 | Ouchi | 385/40 |
| 2004/0245586 A1 | 12/2004 | Partridge et al. | |
| 2004/0248344 A1 | 12/2004 | Partridge et al. | |
| 2005/0025414 A1 | 2/2005 | Kamiyama et al. | |
| 2005/0058128 A1 | 3/2005 | Carson et al. | |
| 2005/0069253 A1 | 3/2005 | Heideman | |
| 2005/0141808 A1 | 6/2005 | Cheben et al. | |
| 2005/0224946 A1* | 10/2005 | Dutta | 257/686 |
| 2007/0048898 A1 | 3/2007 | Carlson et al. | |
| 2008/0080809 A1* | 4/2008 | Kushiyama et al. | 385/14 |
| 2008/0181557 A1* | 7/2008 | Wang et al. | 385/14 |
| 2008/0246106 A1* | 10/2008 | Beausoleil et al. | 257/432 |
| 2009/0263138 A1 | 10/2009 | Pelley et al. | |
| 2009/0263143 A1 | 10/2009 | Pelley et al. | |
| 2009/0311819 A1 | 12/2009 | Chang et al. | |
| 2011/0057306 A1 | 3/2011 | McShane et al. | |
| 2011/0091157 A1* | 4/2011 | Yao et al. | 385/42 |
| 2011/0317958 A1 | 12/2011 | Nadeau et al. | |
| 2012/0051695 A1 | 3/2012 | Harada et al. | |
| 2012/0058616 A1 | 3/2012 | Ahn et al. | |
| 2012/0104389 A1 | 5/2012 | Whitbread et al. | |
| 2012/0129301 A1* | 5/2012 | Or-Bach et al. | 438/129 |
| 2012/0183009 A1 | 7/2012 | Adachi et al. | |
| 2012/0324156 A1 | 12/2012 | Muralimanohar et al. | |
| 2013/0039614 A1 | 2/2013 | Shubin et al. | |
| 2014/0064659 A1* | 3/2014 | Doerr et al. | 385/14 |
| 2014/0362425 A1* | 12/2014 | Stephens et al. | 359/107 |
| 2014/0363119 A1* | 12/2014 | Stephens et al. | 385/14 |
| 2014/0363124 A1* | 12/2014 | Pelley et al. | 385/16 |
| 2014/0363172 A1* | 12/2014 | Pelley et al. | 398/141 |

OTHER PUBLICATIONS

Civitci, F., et al., "Light Turning Mirrors for Hybrid Integration of Optical Waveguides in SiON Technology and CMOS based Photodetectors", Lasers and Electro-Optics Europe (CLEO EUROPE/EQEC), 2011 Conference on and 12th European Quantum Electronics Conference, Munich, May 22-26, 2011, 1 page.

Wang, Wei-Chih et al., Development of an Optical Waveguide Cantilever Scanner, Proceedings of SPIE, vol. 4876, 2003.

Ollier, Eric, Optical MEMS Devices Based on Moving Waveguides, IEEE Journal on Selected Topics in Quantum Electronics, vol. 8, No. 1, Jan./Feb. 2002.

Baets, R. et al., Silicon Photonics, IEEE 2007.

Bisaillon, E. et al., Free-Space Optical Link with Spatial Redundancy for Misalignment Tolerance, IEEE Photonics Technology Letters, vol. 14, No. 2, Feb. 2002.

Bowers, John E. et al., Hybrid Silicon Evanescent Laser on a Silicon-on-Insulator Waveguide, 2006.

Siebel, U. et al., Crosstalk-Enhanced Polymer Digital Optical Switch Based on a W-Shape, IEEE Photonics Technology Letters, vol. 12, No. 1, Jan. 2000.

Paniccia, Mario, Intel Corporation, First Electrically Pumped Hybrid Silicon Laser, UCSB Engineering Insights, Oct. 18, 2006.

Paniccia, Mario, Intel Corporation, First Electrically Pumped Hybrid Silicon Laser, UCSB Engineering Insights, http://www.intel.com/content/dam/www/public/us/en/documents/technology-briefs/intel-labs-hybrid-silicon-laser-announcement.pdf, Sep. 18, 2006.

Samara-Rubio, Dean et al., Customized Drive Electronics to Extend Silicon Optical Modulators to 4 Gb/s, IEEE Journal of Lightwave Technology, vol. 23, No. 12, Dec. 2005.

Johnson, R. Colin, Intel demos 40-Gbit/s Silicon Laser, Aug. 22, 2007.

RP Phototonics, Beam Splitters, http://www.rp-phototonics.com/beam_splitters.html, printed May 13, 2013.

computer weekly.com, IBM debuts prototype terabit optical chip "Holey Optochip," http://www.computerweekly.com/news/2240146552/IBM-unveils-prototype-terabit-optcal-chip, Mar. 8, 2012.

A.N. Udipi et al., Combining Memory and a Controller with Photonics through 3D-Stacking to Enable Scalable and Energy-Efficient Systems, ISCA Jun. 4-8, 2011 http://www.cs.utah.edu/~rajeev/pubs/isca11.pdf.

D. Vantrease et al., Corona: System Implications of Emerging Nanophotonic Technology, ISCA '08 Proceedings of the 35th Annual International Symposium on Computer Architecture, pp. 153-164 http://pages.cs.wisc.edu/~danav/pubs/papers/isca08_corona.pd.

R. Goodwins, Inside Intel's 50 Gbps silicon optics, Jul. 27, 2010, printed Mar. 21, 2013 http://www.zdnet.com/inside-intels-50gbps-silicon-optics-3040089657/.

P. Ramm et al., Through Silicon Via Technology—Process and Reliability for Wafer-Level 3D System Integration, IEEE 2008 Electronic Components and Technology Conference, pp. 841-846.

M. Lapedus, Semiconductor Manufacturing & Design Community, Options and Hurdles Come into Focus for 3D Stacking, http://semimd.com/blog/2012/05/29/6210/, printed May 13, 2013.

C. Strandman et al., Fabrication of 45-degree Mirrors Together with Well-Defined V-Grooves Using Wet Anisotropic Etching of Silicon, IEEE Journal of Microelectromechanical Systems, vol. 4, No. 4, Dec. 1995.

(56) References Cited

OTHER PUBLICATIONS

M. Immonen et al., Fabrication and Characterization of Polymer Optical Waveguides with Integrated Micromirrors for Three-Dimensional Board-Level Optical Interconnects, IEEE Transactions on Electronics Packaging Manufacturing, vol. 28, No. 4, Oct. 2005.

K-W Lee et al., 3D Heterogeneous Opto-Electronic Integration Technology for System-on-Silicon (SOS), 2009 IEEE International Electron Devices Meeting (IEDM), Dec. 7-9, 2009.

J. Brouckaert et al., Thin-Film III-V Photodetectors Integrated on Silicon-on-Insulator Photonic ICs, IEEE Journal of Lightwave Technology, vol. 25, No. 4, Apr. 2007.

RP Photonics, Dielectric Coatings, http://www.rp-photonics.com/dielectric_coatings.html, printed Apr. 16, 2013.

RP Photonics, Dielectric Mirrors, http://www.rp-photonics.com/dielectric_mirrors.html, printed Apr. 16, 2013.

* cited by examiner

ND Stack WITH OPTICAL TSVS

CROSS-REFERENCE TO RELATED APPLICATIONS

U.S. patent application Ser. No. 13/913,993, entitled "Optical Wafer and Die Probe Testing," by inventors Michael B. McShane. Perry H. Pelley, and Tab A. Stephens, filed on even date herewith, describes exemplary methods and systems and is incorporated by reference in its entirety.

U.S. patent application Ser. No. 13/914,049, entitled "Communication System Die Stack," by inventors Tab A. Stephens, Perry H. Pelley, and Michael B. McShane, filed on even date herewith, describes exemplary methods and systems and is incorporated by reference in its entirety.

U.S. patent application Ser. No. 13/914,089, entitled "Integration of a MEMS Beam with Optical Waveguide and Deflection in Two Dimensions," by inventors Tab A. Stephens, Perry H. Pelley, and Michael B. McShane, filed on even date herewith, describes exemplary methods and systems and is incorporated by reference in its entirety.

U.S. patent application Ser. No. 13/914,123, entitled "Method and Apparatus for Beam Control with Optical MEMS Beam Waveguide." by inventor Perry H. Pelley, filed on even date herewith, describes exemplary methods and systems and is incorporated by reference in its entirety.

U.S. patent application Ser. No. 13/914,149, entitled "Optical Redundancy." by inventors Perry H. Pelley, Tab A. Stephens, and Michael B. McShane, filed on even date herewith, describes exemplary methods and systems and is incorporated by reference in its entirety.

U.S. patent application Ser. No. 13/914,178, entitled "Optical Backplane Mirror." by inventors Tab A. Stephens, Perry H. Pelley, and Michael B. McShane, filed on even date herewith, describes exemplary methods and systems and is incorporated by reference in its entirety.

U.S. patent application Ser. No. 13/914,199, entitled "Optical Die Test Interface." by inventors Michael B. McShane. Perry H. Pelley, and Tab A. Stephens, filed on even date herewith, describes exemplary methods and systems and is incorporated by reference in its entirety.

BACKGROUND OF THE INVENTION

1. Field of the Invention

The present invention is directed in general to semiconductor devices and methods for manufacturing same. In one aspect, the present invention relates to the fabrication of semiconductor devices or integrated circuits which use optical communication circuits and devices.

2. Description of the Related Art

In information systems, data signal information is communicated between devices and circuits using different types of signal connections. With electrical conductor-based connections, such as conventional wires or through silicon vias (TSVs), there are power and bandwidth constraints imposed by the power requirements and physical limitations of such conductor-based connections. For example, stacked die modules have been proposed to provide high density information systems, but the power consumption and associated heat dissipation requirements for communicating data signals between stacked die modules using conductor-based connections can limit the achievable density. In addition, the bandwidth of such stacked die modules is limited by the number and inductance of TSVs and other conductor-based connections for such die stacks. To overcome such limitations, optical communication systems have been developed as a way of communicating at higher bandwidths with reduced power. With such optical communication systems, a monochromatic, directional, and coherent laser light beam is modulated to encode information for transfer to other devices or circuits of the system, typically by including a laser beam light source and modulator on each die transferring modulated light signals along one or more optical fiber or waveguide paths formed on the die. Unfortunately, there are design and implementation challenges presented with using optical waveguides to transfer optical information between different integrated circuit (IC) chips in a system in terms of cost, complexity, and control requirements. These challenges arise from integrating laser diode fabrication technology with CMOS logic fabrication technology, both in terms of the different materials and fabrication processes used to make laser diodes and logic devices, but also in terms of the relative complexities of the different types of devices. Even when the fabrication challenges for integrating optical and electrical circuit elements on a single die are overcome, there are additional costs and challenges with routing optical signal information to different die in a die stack in terms of fabricating and aligning optical signal paths across the die stack, as well as design complexity challenges of integrating optical and electrical circuits on each die. As a result, the existing solutions for transferring modulated light signals along optical waveguide paths and between different IC chips make the implementation of high bandwidth optical interconnects extremely difficult at a practical level.

BRIEF DESCRIPTION OF THE DRAWINGS

The present invention may be understood, and its numerous objects, features and advantages obtained, when the following detailed description is considered in conjunction with the following drawings, in which.

Figure 1:
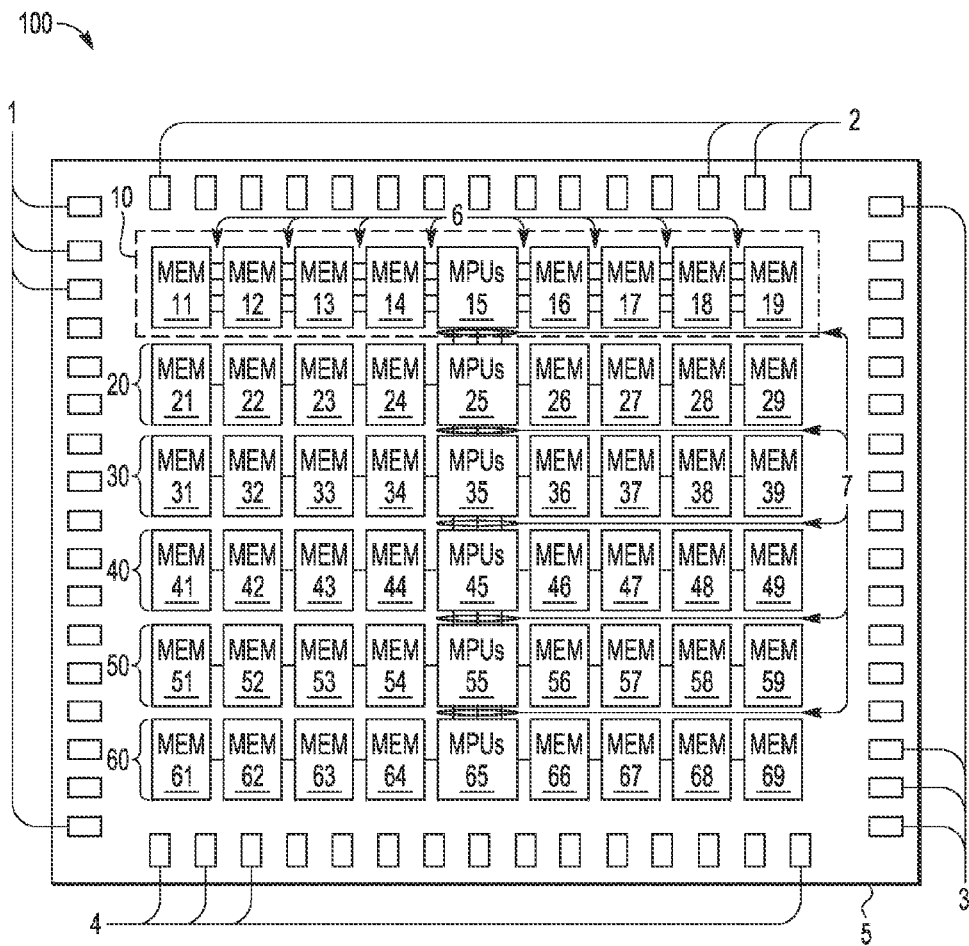
FIG. 1 illustrates a plan view of an information system with side-by-side processor die stack and memory die stack modules connected via optical signals and arranged to form multiple subsystems on a board.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

In this disclosure, an improved high density, low power, high performance information systems, methods, and apparatus are described that address various problems in the art where various limitations and disadvantages of conventional solutions and technologies will become apparent to one of skill in the art after reviewing the remainder of the present application with reference to the drawings and detailed description provided herein. In selected embodiments, a high density, low power, high performance information system, method and apparatus are described in which integrated optical communications are provided in a die stack having electrical and optical through silicon vias (TSVs) and optical I/O devices, where a first semiconductor die in the die stack includes a laser light source or generator (e.g., laser diode) that provides a source of monochromatic coherent unmodulated light for the die stack. Using one or more optical beams, optical waveguides, optical TSV structures, optical mirrors, and/or other optical structures, the unmodulated laser source light beam is routed to other semiconductor die in the die stack which each have a separate optical modulator circuit element. At each optical modulator circuit element, a received electrical input signal is used to convert the received unmodulated laser optical source light beam into a modulated optical signal. In this way, the unmodulated laser source light beam may be separately modulated at each semiconductor die with signal information to generate optical signal information. The optical signal information generated by each semiconductor die may then be transmitted on one or more optical TSV structures, optical waveguides, optical mirrors, and/or other optical structures to the first semiconductor die for transmission other optical circuit receiver elements or waveguides in the die stack or elsewhere. In embodiments where multiple die are formed in a die stack, optical connections between different die are providing by using bulk silicon micromachining technology to fabricate 45 degree mirror structures in each die to transition the optical signals conveyed in beam waveguides perpendicularly into and out of the die. More generally, the mirror structures are formed in an integrated circuit die to perpendicularly deflect or otherwise route optical signals into and out of the lateral plane of a die, where "perpendicular" deflection as used herein may refer to 90 degree deflection angles for optical signals, or any other designed deflection angle resulting from deflection by an angled mirror structures as disclosed herein. In the context of the present disclosure, a "source light beam" refers to an unmodulated light beam (directly from a light source, such as a laser, with no signal) and a "modulated light beam" refers to a light beam carrying a signal. The term "optical beam" refers to either a source light beam or a modulated light beam. "Light" can refer to any portion of the electromagnetic spectrum, whether visible or not. In addition, an "optical waveguide" refers to a physical structure for directing an optical beam, and includes an optical waveguide, an optical TSV structure, and/or an optical mirror structure or other beam deflection structures.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified cross sectional drawings of a semiconductor device without including every device feature or geometry in order to avoid limiting or obscuring the present invention. In addition, selected aspects are depicted with reference to simplified circuit or block diagram depictions without including every device circuit detail in order to avoid limiting or obscuring the present invention. In addition, although specific example materials are described herein, those skilled in the art will recognize that other materials with similar properties can be substituted without loss of function. It is also noted that, throughout this detailed description, certain materials will be formed and removed to fabricate the optical beams, optical circuit elements, and associated control circuits. Where the specific procedures for forming or removing such materials are not detailed below, conventional techniques to one skilled in the art for growing, depositing, removing or otherwise forming such layers at appropriate thicknesses shall be intended. Such details are well known and not considered necessary to teach one skilled in the art of how to make or use the present invention.

Turning now to FIG. 1, there is shown a simplified plan view of a information system 100 with a plurality of die stacks arranged in rows 11-19, 21-29, 31-39, 41-49, 51-59, 61-69 and columns (e.g., 11, 21, 31, 41, 51, 61). In the depicted example, the information system 100 includes side-by-side processor die stack modules (e.g., 15, 25, 35, 45, 55, and 65) and memory die stack modules (e.g., 11-14 and 16-19) connected via light beams 6, 7 and arranged to form multiple subsystems (e.g., 10, 20, 30, 40, 50, 60) on a system board 5. For example, a first subsystem 10 includes a central processor die stack module 15 connected between a row of memory die stack modules 11-14 and 16-19, all of which are connected together via light beam 6. In similar fashion, the die stack modules 21-29 of the second subsystem 20 are connected together via light beams 6 between the die stack modules 21-29, and are connected to the first subsystem 10 by one or more light beams 7 between the central processor die stack modules 15, 25. Likewise, the rows of die stack modules 31-39, 41-49, 51-59, and 61-69 forming subsystems 30, 40, 50, 60, respectively, are connected together via optical beams and modulated optical signals 6, with connections between the subsystems 30, 40, 50, 60 provided by one or more light beams 7 between the central processor die stack modules 25, 35, 45, 55, 65.

With the disclosed information system 100, a high density, low power, high performance packaging arrangement of die stack modules uses optical MEMs devices to provide optical communication links between die stacks in a subsystem, and between subsystems. For example, in a first subsystem 10, a microprocessor unit (MPU) die stack module 15 is formed with TSVs, copper pillars, flip chip bumps (not shown) to provide vertical signal and power conductors for the MPU die stack module 15. In addition, each MPU die may include deflectable optical MEMS devices, deflectable MEMS opticalbeam waveguides and optical feed-throughs (not shown), for sending and/or receiving lateral light beams 6, 7 to adjacent die stack modules.

Once mounted on the system substrate board 5, the processor die stack modules (e.g., 15, 25, 35, 45, 55, and 65) and memory die stack modules (e.g., 11-14 and 16-19) may be connected through conductors (not shown) in the substrate board 5 to connection pads 1-4 for electrical and/or optical connection to external systems. In addition, the die stack modules may be implemented with both horizontal and vertical die stacks to facilitate optical signal communication between multiple die stacks of microprocessors and memory die. For example, by orienting the central MPU die stack module (e.g., 15) as a horizontal die stack and orienting the memory die stack modules (e.g., 11-14, 16-19) as vertical die stacks, the MPU and memory die stack modules are perpendicular to each other. This orientation enables each processor die in the MPU die stack module 15 to communicate with each of the memory die in the adjacent memory die stack modules 14, 16 using direct optical signals 6. And by including optical feed-throughs in the memory die stack modules (e.g., 12-14 and 16-18), the central MPU die stack module (e.g., 15) can communicate through a memory die stack module to one or more non-adjacent memory die stacks using feed-through optical signals 6. In similar fashion, by including optical feed-throughs in the processor die stack modules (e.g., 25, 35, 45, and 55), each processor in a central MPU die stack module can communicate with every other processor in the system using feed-through optical signals 7. In support of the optical signal communications, each processor and memory die in the die stack modules may be formed to integrate both transistor circuitry for implementing information handling operations, and optical circuitry for transmitting and/or receiving optical signal information via one or more waveguides terminating in deflectable MEMS optical beam waveguides at the die edge of the processor and memory die. By integrating multiple die stack modules with an optical communication system, the resulting communication system 100 provides higher density and bandwidth due to the replacement of electrical conductors (and associated inductances) with optical interconnects to provide a low cost, low power, high bandwidth stacked die assembly.

Figure 2:
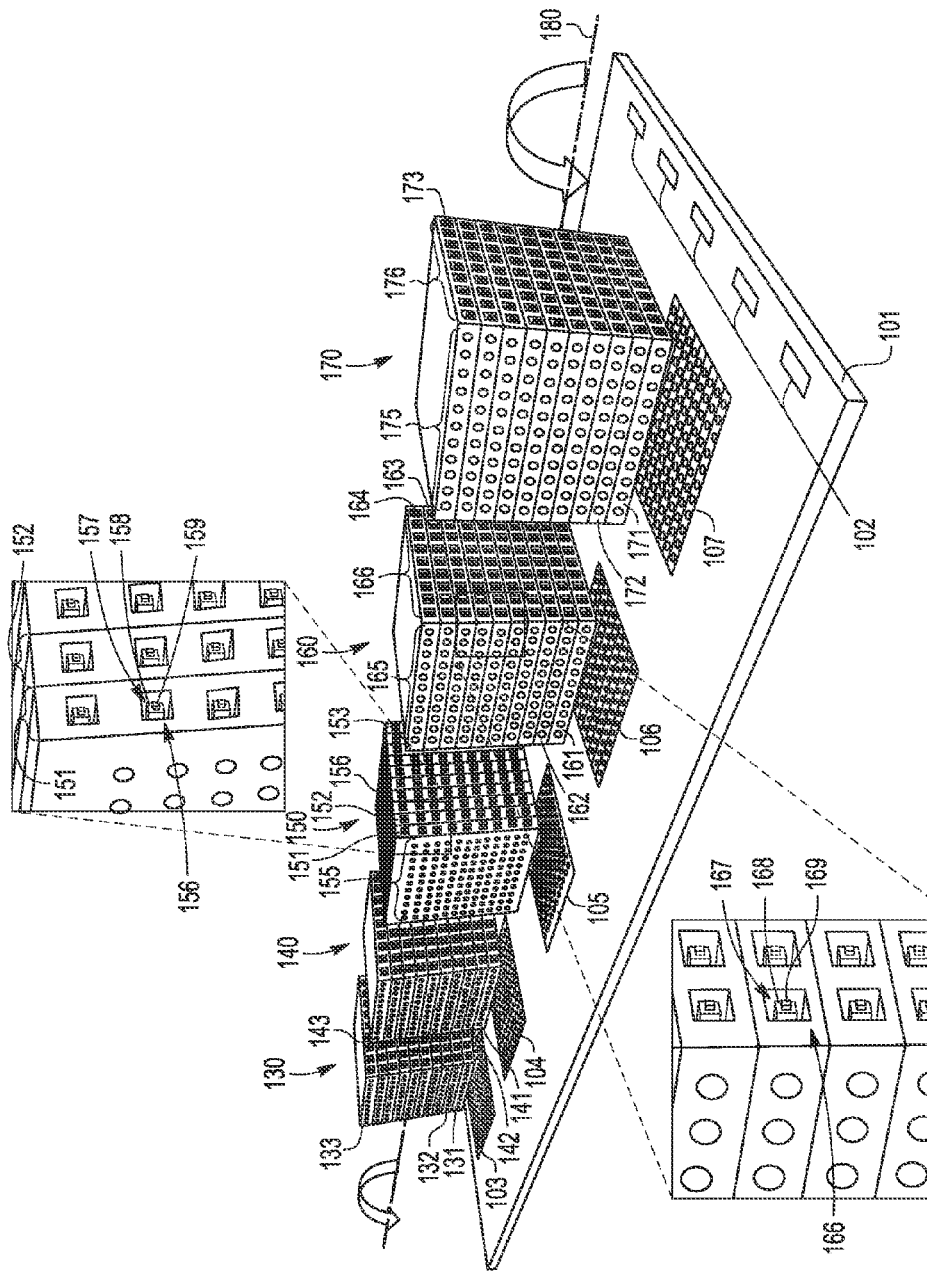
FIG. 2 illustrates a perspective view of a side-by-side die stack system with optical interconnects prior to rotation and attachment wherein a processor die stack module is oriented perpendicularly to one or more memory die stack modules.
Figure 3:
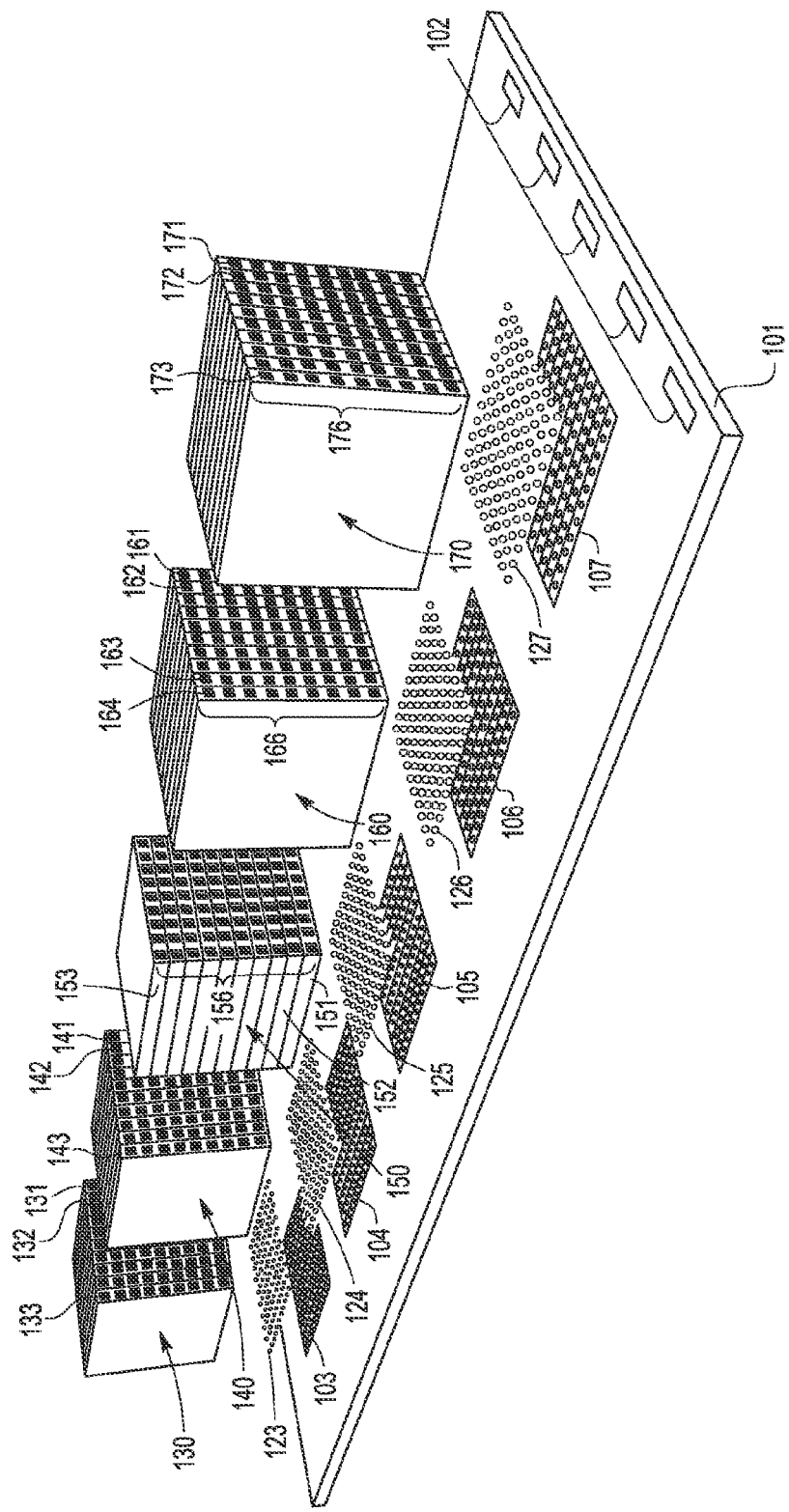
FIG. 3 illustrates a perspective view of the side-by-side die stack system with optical interconnects in FIG. 2 after rotation and alignment with solder ball arrays for connection to a system board.
Figure 4:
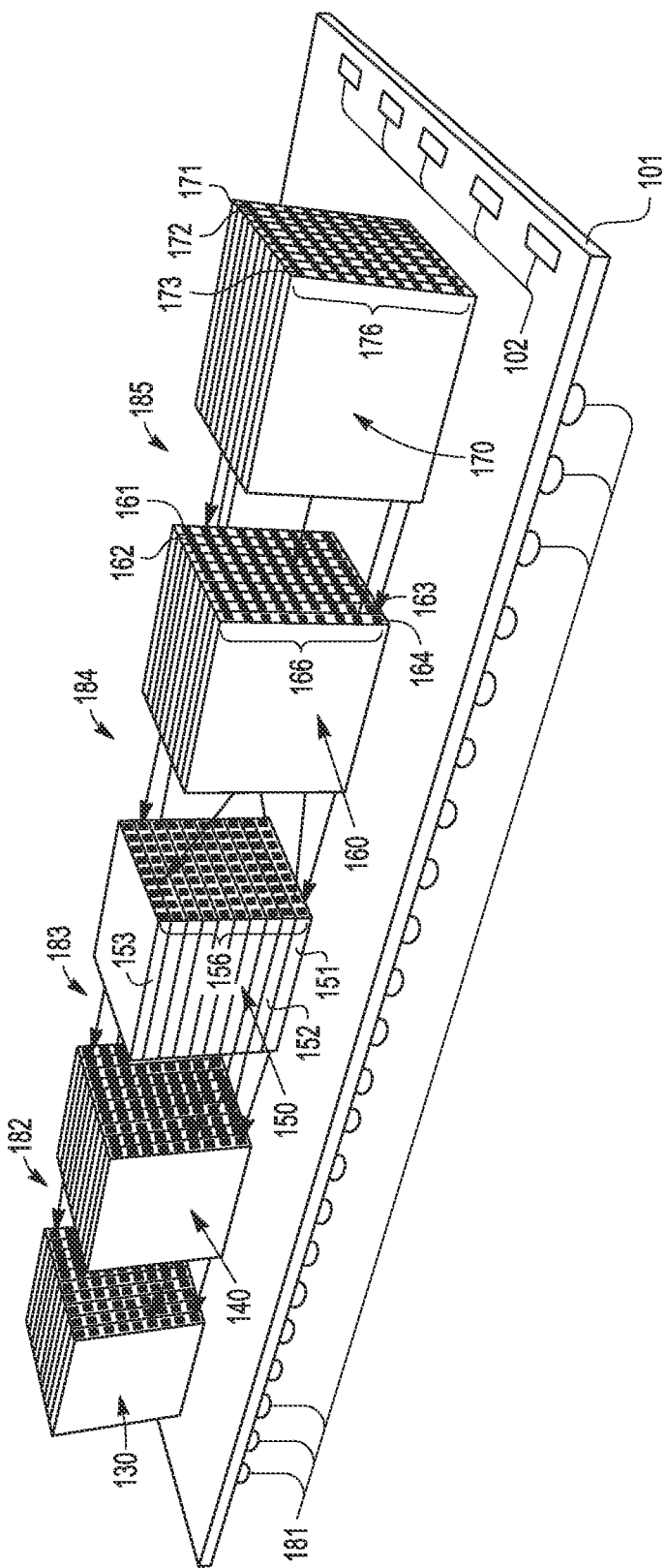
FIG. 4 illustrates a perspective view of the side-by-side die stack system in FIG. 3 after attachment of the die stack system to the system board with solder ball or flip-chip conductors to illustrate how point-to-point optical communications can be used to communicate between individual processor die and memory die in the die stack system.

To illustrate a fabrication assembly of an example stacked die assembly, reference is now made to FIGS. 2-4. Beginning with FIG. 2, there is shown a perspective view of a side-by-side stacked die assembly with optical interconnects in an initial stage of fabrication prior to rotation and attachment to the contact pads 103-107 on the system board 101. The depicted stacked die assembly includes a central processor die stack 150 which is formed with a plurality of processor die 151, 152, 153. As shown in the enlarged view of the central processor die stack 150 in FIG. 2, the processor die 151, 152, 153 are each oriented vertically (e.g., on a die edge) and vertically stacked together with a first processor die 151 in the front (or left) position, a second processor die 152 in the second position, and so on until the last processor die 153 in the back (or right-most) position. The enlarged view of the processor die stack 150 in FIG. 2 also shows that one or more die edge optical deflectable MEMS optical beam waveguides 156 are formed in a die edge cavity 157 with a waveguide beam structure which includes an optical beam structure 159 surrounded by an encapsulating waveguide structure 158 for guiding any modulated light signals along the path of the optical beam structure 159. In the central processor die stack 150, the processor die 151, 152, 153 are attached together with film adhesive, fusion wafer bonding, or any other suitable die attachment mechanism (not shown). If desired, the central processor die stack 150 may also include heat spreader and/or sink structures positioned between and/or around the individual processor die 151-153 to dissipate heat therefrom. To facilitate die-to-die signal and power connections within the processor die stack 150, each processor die 151, 152, 153 may include through silicon via (TSV) conductors. In addition, at least an edge processor die 151 may include a plurality of external pads or conductors 155 (e.g., approximately 1000), such as a filled TSV or edge connection pads, for providing electrical contact to thermoelectric devices, such as solder balls, copper pillars, or flip-chip bumps. In selected embodiments, the edge processor die 151 may also include optical TSV structures for providing optical contact to optical routing structures (e.g., optical beam waveguides) in the system board 101. Once mounted on the system board 101, the processor die stack 150 may be connected through conductors (not shown) in the system board 101 to connection pads 102 for electrical connection to external systems. Finally, in some embodiments, each processor die 151-153 may include a plurality of deflectable MEMS optical beam waveguides 156 (e.g., approximately 100 to 200) at a lateral die edge for providing optical die-to-die communication with or through adjacent die stacks.

The depicted stacked die assembly also includes a plurality of memory die stacks (e.g., 130, 140, 160, and 170) positioned on opposite sides of the central processor die stack 150. On the left of the central processor die stack 150, a first memory die stack 130 includes a plurality of memory die 131, 132, 133 which are horizontally oriented and stacked together, and a second memory die stack 140 includes a plurality of memory die 141, 142, 143 which are horizontally oriented and stacked together. And to the right of the central processor die stack 150, a third memory die stack 160 includes a plurality of memory die 161, 162, 163, 164 which are horizontally oriented and stacked together, and a fourth memory die stack 170 includes a plurality of memory die 171, 172, 173 which are horizontally oriented and stacked together. Though two memory stacks are shown on each side, it will be appreciated that additional or fewer memory die stacks may be used. As shown in the enlarged view of the example memory die stack 160 in FIG. 2, the memory die (e.g., 161-164) are each oriented to be horizontally stacked together with a first memory die 161 on the bottom, a second memory die 162 on top of the first memory die 161, and so on until the top memory die 164 in the top position. In each memory die stack (e.g., 130, 140, 160, and 170), the memory die (e.g., 161-164, 171-173) are attached together with film adhesive, fusion wafer bonding, or any other suitable die attachment mechanism (not shown). The enlarged view of the memory die stack 160 in FIG. 2 also shows that one or more die edge deflectable MEMS optical beam waveguides 166 are formed in a die edge cavity 167 with a waveguide beam structure which includes an optical beam structure 169 surrounded by an encapsulating waveguide structure 168 for guiding any modulated light signals along the path of the optical beam structure 169. In other embodiments, the waveguide structure is not deflectable. If desired, heat spreader and/or sink structures may be positioned between and/or around the memory die stacks to dissipate heat therefrom. To facilitate die-to-die signal and power connections within each memory die stack, each memory die (e.g., 161-164, 171-173) may include TSV conductors, and at least an edge memory die (e.g., 161, 171) may include a plurality of external pads or conductors 165, 175 (e.g., approximately 20) for edge bump connections to the system board 101, such as a filled TSV or edge connection pads. Once mounted on the system board 101, the memory die stacks may be connected through conductors (not shown) in the system board 101 to connection pads 102 for electrical connection to external systems. In addition, each memory die (e.g., 161-164, 171-173) may include a plurality of deflectable MEMS optical beam waveguides 166, 176 (e.g., approximately 100 to 200) at a lateral die edge for providing optical die-to-die communication with or through adjacent die stacks.

In other embodiments, the die in the die stacks 130, 140, 150, 160, 170, such as the processor die 151 or memory die 161, may be formed as a composite of two separately manufactured die. In these embodiments, the first die includes electrical components that are formed using standard semiconductor transistor fabrication technology, and the second die includes optical components, such a waveguides, modulators and laser sources, that are formed using primarily optical fabrication technology. By separately fabricating the composite die using different fabrication technologies, the manufacturing cost of processor die and the memory die can be reduced, thus allowing for a lower cost of system 100. In selected embodiments, the first and second composite die could be combined before stacking so the die stacks would be an assembly of composite die. In other embodiments, the electrical and optical die would remain separate until combined into the die stack modules.

In the illustrated die stack assembly shown in FIG. 2, the central processor die stack 150 is oriented perpendicularly to the memory die stacks (e.g., 130, 140, 160, and 170), with the central processor die stack module 150 oriented as a vertical die stack 151-153, and the memory die stack modules 130, 140, 160, 170 oriented as horizontal die stacks 131-133, 141-143, 161-164, 171-173 so as to be perpendicular to each other. This relative perpendicular orientation is maintained as the depicted stacked die assembly is rotated ninety degrees around the rotation axis 180, as illustrated in FIG. 3 which shows a perspective view of the side-by-side stacked die assembly with optical interconnects in FIG. 2 after rotation and alignment. However, after rotation, the central processor die stack module 150 is oriented as a horizontal die stack 151-153, and the memory die stack modules 130, 140, 160, 170 are oriented as vertical die stacks 131-133, 141-143, 161-164, 171-173 so as to be perpendicular to each other. As illustrated in FIG. 3, the processor and memory die stack modules 130, 140, 150, 160, 170 are oriented and aligned with a corresponding plurality of thermoelectric conductor arrays 123-127 (e.g., solder balls, copper pillars, or flip-chip bumps) to make electrical connection with the contact pads 103-107 on the system board 101. In particular, the rotated orientation of the die stack assembly positions the external pads or conductors (e.g., 155, 165, 175 shown in FIG. 2) on the processor and memory die stacks (e.g., 150, 160, and 170) to make electrical contact with the contact pads (e.g., 105-107) on the system board 101.

Turning now to FIG. 4, there is shown a perspective view of the side-by-side stacked die assembly in FIG. 3 after attachment of the processor and memory die stack modules 130, 140, 150, 160, 170 to the system board 101 having external conductors 181, such as copper pillars, solder balls or flip chip interconnects, connected on an opposite side. Though not visible in FIG. 4, the thermoelectric conductor arrays 123-127 (from FIG. 3) are positioned between the system board 101 and the processor and memory die stack modules 130, 140, 150, 160, 170 to make electrical connection with the contact pads 103-107 on the system board 101. In selected embodiments, the solder ball or flip chip arrays 123-127 are soldered in place on the system board 101 in a reflow furnace, and then the stacked die assembly is placed on the solder ball or flip chip arrays 123-127 for a second reflow. In other embodiments, the thermoelectric conductor arrays 123-127 may be implemented with solder ball or flip chip arrays that are formed as reflow solder balls on the bottom of the die stacks. In yet another embodiment, the solder ball or flip chip arrays 123-127 are placed on the system board 101 with flux, followed by placing the die stacks and reflowing the entire group together.

Once attached to the system board 101, point-to-point optical communications can be used to communicate between individual processor die and memory die in the stacked die assembly. For example, the processor die stack module 150 may communicate with the adjacent memory die stacks 140, 160 using point-to-point optical beam signals 183, 184, respectively. And by using optical feed-throughs in the memory die stacks 140, 160 formed with waveguides in the die that are connected to deflectable MEMS optical beam waveguides at each die edge, the processor die stack module 150 may communicate with the non-adjacent memory die stacks 130, 170 using point-to-point light beams (e.g., modulated light beams) 182, 185. As will be appreciated, the stacked die can be implemented with other configurations in other embodiments, such as non-perpendicular orientations, other electrical connection and/or system board configurations, other stacking assembly configurations, etc.

Figure 5:
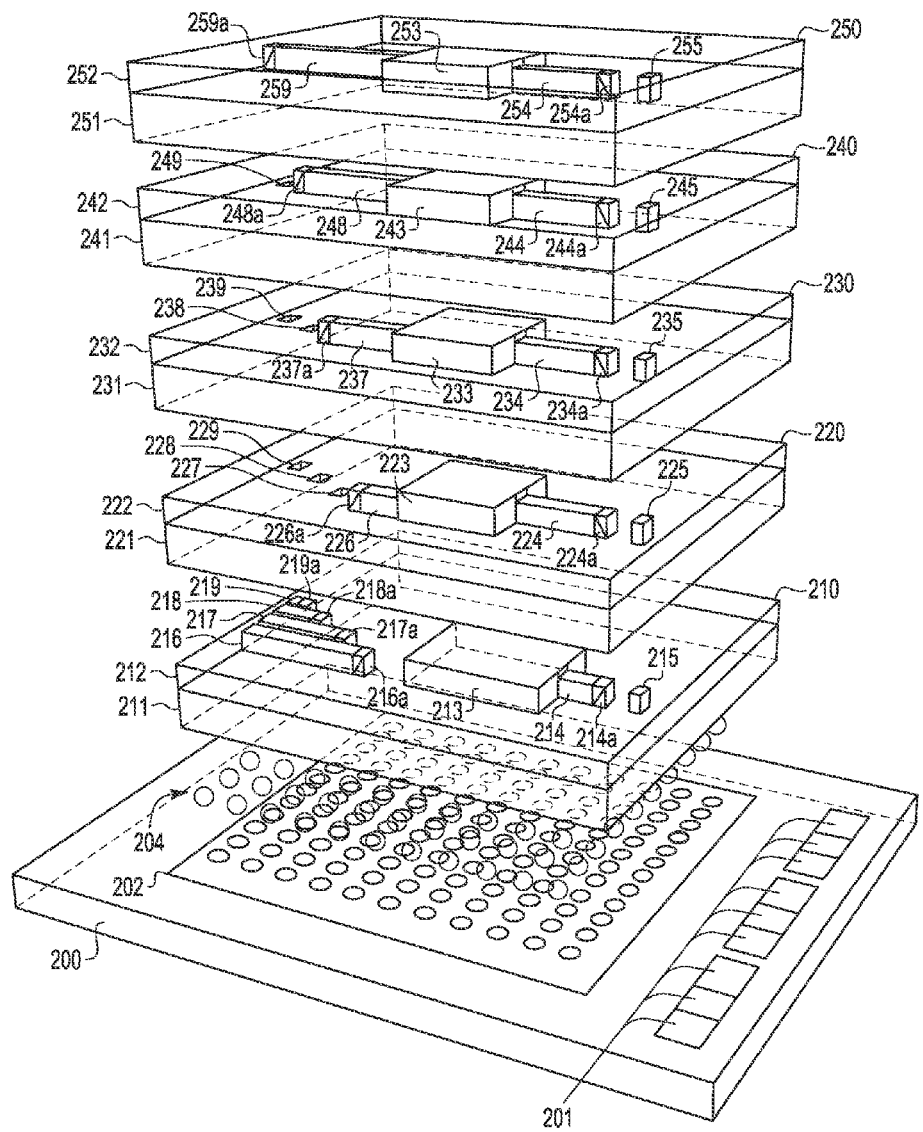
FIG. 5 illustrates a perspective exploded view of a selected die stack having a single laser on a first die as a source of monochromatic coherent unmodulated light which is communicated by optical beams and/or optical through silicon via (TSV) structures to a plurality of additional die which each have a separate optical modulator circuit element.

Within any one or more of the die stack modules (e.g., processor 150), a high density, low power, high performance optical communication system uses electrical and optical through silicon vias (TSVs) to efficiently communication optical signal information through the die stack module(s). Given the parallel orientation of the individual die within any die stack module, each laterally disposed die includes an optical communication system for receiving and/or transmitting optical signals from or to other die in the die stack module using one or more light beams, optical TSV structures, and/or optical mirrors that are disposed to perpendicularly deflect a light beam into or out of the plane of the laterally disposed die. To illustrate this optical communication system, reference is now made to FIG. 5 which shows a perspective exploded view of a die stack (e.g., the processor die stack module 150) in which a plurality of die 210, 220, 230, 240, 250 are oriented and aligned for connection to one another and to a conductor array 204 (e.g., solder balls, copper pillars, or flip-chip bumps), contact pads 202, and system board 200. Only a portion of the conductor array 204 is shown in FIG. 5 for illustration clarity.

The depicted die stack includes a first die 210 which is formed with one or more substrate structure layers 211 that are covered by one or more dielectric or insulation layers 212. As depicted, the first die 210 includes one or more electrical TSV structures 215 for conveying electrical signal information generated by electrical circuitry (not shown) at the first die 210 to other die (e.g., 220, 230, 240, 250) when assembled as a die stack module. In selected embodiments, first die 210 also functions as an optical source die by including a laser generator module 213 with associated laser optical beam routing structures 214, 214a (for routing an unmodulated laser signal to other die) and one or more output optical waveguide beams 216-219 (for outputting modulated optical signals from the die stack module). The laser generator module 213 may be implemented as a silicon laser source that includes a laser diode formed in a laser cavity, where the laser diode includes a P-type region and an N-type region which are biased at different voltages to produce photons at a particular wave length. Of course, other types of laser generators may be implemented in other embodiments. However implemented, the laser generator module 213 generates monochromatic coherent unmodulated light which may be routed or communicated to other die (e.g., 220, 230, 240, 250) by transmitting the unmodulated laser signal down a first optical waveguide 214 (e.g., a silicon core surrounded by oxide layers) to a first optical mirror structure 214a (e.g., a 45 degree mirror structure formed at a silicon/oxide interface layer or other reflective surface). At the first optical mirror structure 214a, the unmodulated laser signal is deflected perpendicularly out of the lateral plane of the first die 210 to proceed vertically upward (in the orientation of FIG. 5). Though not shown, it will be appreciated that the first die 210 may also include one or more in-plane mirrors (e.g., 45 degree mirrors) for deflecting the unmodulated optical signal within the plane of the first die 210.

To output modulated optical signals returned by the other die (as described below), the first die 201 also includes output optical waveguide beam(s) 216-219 that are positioned to output the modulated optical signals from the die stack module. For example, a first output optical mirror structure 216a (e.g., a 45 degree mirror structure formed at a silicon/oxide interface layer) receives a modulated optical signal in a plane that is perpendicular to the lateral plane of the first die 210. At the first output optical mirror structure 216a, the modulated optical signal is deflected perpendicularly into the lateral plane of the first die 210 to proceed down the first output optical waveguide 216 (e.g., a silicon optical beam surrounded by one or more oxide waveguide layers) to the die edge of the first die 210. In selected embodiments, a single output optical waveguide 216 may be used to output modulated optical signals generated from unmodulated laser source light beams having different frequencies. However, one or more additional, non-intersecting output optical waveguides 217-219 may be used to output modulated optical signals generated from a single unmodulated laser source light beam such that each received modulated optical signal is perpendicularly deflected by an output optical mirror structure 217a, 218a, 219a to proceed in the lateral plane of the first die 210 and down the corresponding output optical waveguide 217, 218, 219 to the die edge of the first die 210. In any case, there are a number of potential advantages from sharing a single laser source die with a one or more receiver modulator die in terms of reduced cost, complexity, and control requirements, thus allowing for more efficient, low cost systems.

The depicted die stack also includes a second die 220 that is aligned and positioned over the first die 210. In selected embodiments, the second die 220 may be a processor die or a memory die which is formed with one or more substrate structure layers 221 that are covered by one or more dielectric or insulation layers 222. In other embodiments, the second die 220 may be formed with a different fabrication technology (e.g., bulk semiconductor substrate technology) than is used to form the first die 210 (e.g., semiconductor-on-insulator substrate technology). For example, a receiver die including a processor core, memory circuit, or other type of logic circuitry that generates information may be made by a CMOS process, while the first die which includes a laser diode may be made of Indium Phosphide or other material. Though not shown, the second die 220 includes electrical circuitry for receiving, processing, and/or generating electrical signal information which is routed through one or more electrical TSV structures 225 to convey electrical signal information between die. In addition, the second die includes an optical modulator module 223 which encodes electrical signals onto a received unmodulated laser source light beam, such as by using a modulating capacitor to modulate a received source light beam. But instead of including a laser generator module on the second die 220, the depicted second die 220 receives the unmodulated laser source light beam through the optical routing structures 224, 224a which are positioned over the optical routing structures 214, 214a. In selected embodiments, the optical routing structures 224, 224a include a second optical mirror structure 224a (e.g., a 45 degree partially reflecting mirror structure for partially deflecting the received laser signal) and a second optical waveguide 224 (e.g., a silicon optical beam surrounded by one or more oxide waveguide layers). By positioning the second optical mirror structure 224a in optical alignment with the first optical mirror structure 214a, a second optical mirror structure 224a deflects the unmodulated source light beam sent from the first die 210 (and through an optical TSV in the substrate 221) to proceed perpendicularly into the lateral plane of the second die 220 and through the second optical waveguide 224.

The second die 220 also includes an output optical waveguide structure 226, 226a for outputting modulated optical signals from the optical modulator module 223. In selected embodiments, the output optical waveguide structure 226, 226a includes a second output optical waveguide 226 (e.g., a silicon core surrounded by oxide) and a second output optical mirror structure 226a (e.g., a 45 degree mirror structure formed at a silicon/oxide interface layer or other reflective surface). By positioning the second output optical mirror structure 226a in optical alignment with the first output optical mirror structure 216a, the second output optical mirror structure 226a perpendicularly deflects the modulated optical signal from the optical modulator module 223 to proceed through an optical TSV in the substrate 221 to the first output optical mirror structure 216a for perpendicular deflection along the first output optical waveguide 216. In alignment with the output optical mirror structure 226a, the second die 220 also includes an optical TSV formed in the substrate layer(s) 221 which may also include one or more additional optical TSVs 227, 228, 229 formed in alignment with output optical mirror structures formed on other die. Though not shown, it will be appreciated that the second die 220 may also include one or more in-plane mirrors (e.g., 45 degree mirrors) for deflecting the unmodulated and/or modulated optical signal within the plane of the second die 220.

If desired, the die stack may include additional die which are assembled in wafer form as a wafer stack prior to singulation, or are assembled as singulated die in a die stack. For example, a third, fourth, and fifth die 230, 240, 250 may be aligned and positioned over the first and second die 210, 220. As disclosed herein, each additional die may be a processor die or a memory die which is formed with any desired fabrication technology to include one or more substrate structure layers 231, 241, 251 that are covered by one or more dielectric or insulation layers 232, 242, 252, respectively. In addition to including one or more electrical TSV structures 235, 245, 255 for conveying electrical signal information between die, each additional die includes an optical modulator module 233, 243, 253 for encoding electrical information onto a received unmodulated laser signal. To receive the unmodulated source light beams, each additional die includes optical routing structures 234/234a, 244/244a, 254/254a which may be positioned over the first die's laser beam routing structures 214/ 214a. In other embodiments, the optical routing structures 234/234a, 244/244a, 254/254a in the additional die 230, 240, 250 may be positioned to receive a separately provided unmodulated source light beams, either from a separate laser generator or laser beam routing structures (not shown). In selected embodiments, each optical laser beam routing structure 234/234a, 244/244a, 254/254a includes an optical mirror structure 234a, 244a, 254a (e.g., a 45 degree mirror structure for partially or fully deflecting the received laser signal) and an optical waveguide 234, 244, 254 (e.g., a silicon core surrounded by oxide). By positioning the additional optical mirror structure(s) 234a, 244a, 254a in optical alignment with the first optical mirror structure 214a, the unmodulated laser source light beam sent from the first die 210 (and through any optical TSV in the intervening substrates) is partially or fully deflected to proceed perpendicularly into the lateral plane of each die 230, 240, 250 and through the optical waveguides 234, 244, 254 for delivery to the respective optical modulator module 233, 243, 253.

In similar fashion, each additional die 230, 240, 250 may also include additional output optical waveguide structures 237/237a, 248/248a, 259/259a, respectively, for outputting modulated optical signals from the optical modulator modules 233, 243, 253. In selected embodiments, each additional output optical waveguide structure includes an output optical waveguide 237, 248, 259 (e.g., a silicon core surrounded by oxide) and an associated output optical mirror structure 237a, 248a, 259a (e.g., a 45 degree mirror structure formed at a silicon/oxide interface layer or other reflective structure). At each die 230, 240, 250, an optical TSV may be formed in the substrate layer(s) 231, 241, 251 in alignment with the output optical mirror structure 237a, 248a, 259a for the respective die. If required, each sandwiched die (e.g., 230, 240) may also include one or more additional optical TSVs 238/239, 249 formed in the substrate layer(s) 231, 241 in alignment with output optical mirror structures formed over the sandwiched die. By positioning the output optical mirror structure 237a, 248a, 259a in a non-intersecting configuration to provide optical alignment with the output optical mirror structures 217a, 218a, 219a, respectively, the output optical mirror structure 237a, 248a, 259a in each additional die perpendicularly deflects the modulated optical beam signal from the optical modulator module 233, 243, 253 to proceed through optical TSVs in the intervening substrates to the corresponding output optical mirror structures 217a, 218a, 219a in the first die for perpendicular deflection along the a corresponding output optical waveguide 217, 218, 219. Though not shown, it will be appreciated that any one or more of the additional die 230, 240, 250 may also include one or more in-plane mirrors (e.g., 45 degree mirrors) for deflecting the unmodulated and/or modulated optical signal within the plane of said die.

Figure 6:
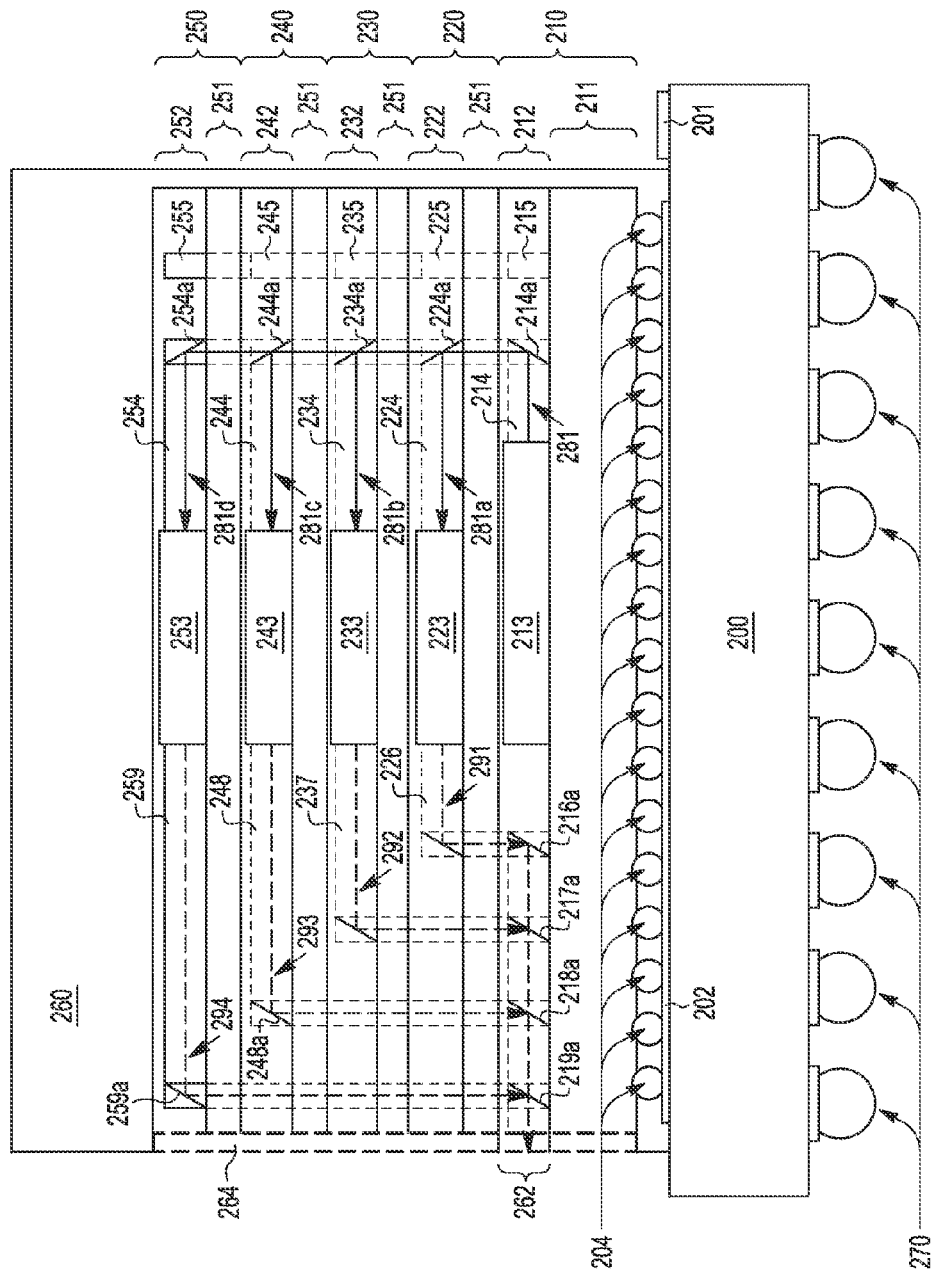
FIG. 6 illustrates a cross-sectional side view of the die stack of FIG. 5 after assembly and packaging.

To illustrate the routing of light beams through the different die, reference is now made to FIG. 6 which shows a cross-sectional side view of the die stack of FIG. 5 after assembly and packaging. In selected embodiments, the die stack may be formed by assembling a stack of wafers in a wafer stack which is then singulated to form the die stack, though in other embodiments, a plurality of singulated die may be assembled as a die stack. As illustrated, the plurality of die 220, 230, 240, 250 are attached to the first optical source die 210 with appropriate alignment of any electrical and optical through silicon vias (TSVs), such as by using one or more adhesive materials, compression bonding, or any other suitable attachment mechanism. The optical source die 210 is also electrically connected via the conductor array 204 and contact pads 202 to a top surface of the system board 200, alone or in combination with additional optical routing structures (not shown) for routing optical signals to and through the system board 200. On the opposite surface of the system board 200, external conductors 270, such as copper pillars, solder balls or flip chip interconnects, are connected in a ball grid array (BGA) configuration or other suitable packaging configuration. As depicted, the thermoelectric conductor array 204 is positioned between the system board 200 and the optical source die 210 to make electrical connection with the contact pads 202 on the system board 200. In selected embodiments, the solder ball or flip chip array 204 is are soldered in place on the system board 200 in a reflow furnace, and then the stacked die assembly is placed on the solder ball or flip chip array 204 for a second reflow. In other embodiments, the thermoelectric conductor array 204 may be implemented with solder ball or flip chip arrays that are formed as reflow solder balls on the bottom of the die stacks. In yet another embodiment, the solder ball or flip chip array 204 is placed on the system board 200 with flux, followed by placing the die stacks and reflowing the entire group together. After attachment to the system board 200, the mounted plurality of die 210, 220, 230, 240, 250 are molded or encapsulated with an encapsulation packaging to form a protective packaging or housing 260 having top and side surfaces.

Once the packaged die 210, 220, 230, 240, 250 are attached to the system board 200, the electrical and optical through silicon vias (TSVs) formed therein may be used to convey electrical and optical communication signals between die in the die stack 210, 220, 230, 240, 250. But to avoid the expense and fabrication complexity of supporting optical communications by forming a laser source on each die, the depicted die stack includes a single laser source 213 located on the optical source die 210 to generate a coherent unmodulated light signal 281 which is communicated by optical waveguides and/or optical TSV structures and perpendicular deflection mirrors to the other die 220, 230, 240, 250, each of which has its own optical modulator circuit element 223, 233, 243, 253. In this way, each optical modulator circuit element 223, 233, 243, 253 on the receiving die 220, 230, 240, 250 may be used to modulate the received unmodulated source light beams 281a-d, thereby converting electrical signals into optical signals.

To illustrate the routing of optical signals between the optical source die 210 and the second die 220, the cross-sectional side view of FIG. 6 shows that the laser generator module 213 on the optical source die generates and transmits an unmodulated source light beam 281 down a waveguide routing structure 214 to a first optical mirror structure 214a where the unmodulated laser source light beam is deflected perpendicularly out of the lateral plane of the first die 210 to proceed vertically upward through an optical TSV formed in the substrate structure layer(s) 221. The deflected source light beam 281 then proceeds to a second optical partially reflective mirror structure 224a which is positioned over the first optical mirror structure 214a. At the second optical partially reflective mirror structure 224a, the deflected source light beam 281 is partially deflected perpendicularly into the lateral plane of the second die 220 to proceed as a horizontally deflected signal 281a through the second optical waveguide 224 and to the optical modulator module 223 which encodes electrical signals onto the received unmodulated source light beam 281a. The remainder of the source light beam 281 is transmitted through partially reflective mirror structure 224 to be received by mirror structures 234a, 244a, 254a. The resulting modulated optical signal 291 generated by the modulator 223 is then transmitted through a second output optical waveguide 226 to a second output optical mirror structure 226a which perpendicularly deflects the signal 291 to proceed through an optical TSV in the substrate 221 to the first output optical mirror structure 216a for perpendicular deflection along the first output optical waveguide 216 for output from the optical source die 210.

In similar fashion, optical signals may be routed from the single laser source 213 on the optical source die 210 to the third die 230, thereby sharing the laser source 213 between the die 220, 230. In other embodiments, the optical source die 210 may include an additional laser source (not shown) for generating an unmodulated laser signal having a different frequency from the unmodulated light signal 281. In either case, the generated unmodulated light beam 281 is transmitted down a laser beam routing structure 214 to a first optical mirror structure 214a where it is deflected perpendicularly to proceed vertically upward through an optical TSV formed in the substrate structure layer(s) 221 and to the second optical partially reflective mirror structure 224a which is positioned over the first optical mirror structure 214a. Due to the partial reflection qualities of the second optical partially reflective mirror structure 224a, part of the deflected light beam 281 proceeds through the second optical partially reflective mirror structure 224a, through an optical TSV formed in the substrate structure layer(s) 231, and to the third optical partially reflective mirror structure 234a which is positioned over the second optical mirror structure 224a. At the third optical partially reflective mirror structure 234a, the deflected light beam 281 is partially deflected perpendicularly into the lateral plane of the third die 230 to proceed as a horizontally deflected signal 281b through the third optical waveguide 234 and to the optical modulator module 233 which encodes electrical information onto the received unmodulated source light beam 281b. The non-deflected portion of source light beam 281 is transmitted through partially reflecting mirror structure 234a and continues on to be received by the partially reflective mirror structures 244a and 255a. The resulting modulated optical signal 292 generated by the modulator 233 is then transmitted through a third output optical waveguide 237 to a third output optical mirror structure 237a which perpendicularly deflects the signal 292 to proceed through an optical TSVs and routing structures in the substrate 231 and second die 220 to the second output optical mirror structure 217a for perpendicular deflection along the second output optical waveguide 217 for output from the optical source die 210. In embodiments where unmodulated laser signals having a different frequencies are generated at the optical source die 210, the output optical waveguide structures may use shared optical waveguide paths since the modulated optical signals having different frequencies can be separated out at an optical receiver (not shown).

If additional die are included in the die stack, the same optical signal routing approach may be used to share a single laser source 213 on the optical source die 210. For example, optical signals may be routed to one or more additional die 240, 250 by generating the unmodulated light beam 281 at the laser source 213, and then transmitting the source light beam 281 down an optical waveguide 214 to a first optical mirror structure 214a for perpendicular deflection upward through aligned optical TSVs and optical partially reflective mirror structures (e.g., 224a, 234a, 244a) formed on adjacent die (e.g., 220, 230, 240). Due to the partial reflection qualities of the optical partially reflective mirror structures 224a, 234a, 244a, part of the deflected light beam 281 proceeds through optical TSV(s) formed in the substrate layer(s) (241, 251) over overlying die. At each destination die, an optical partially reflective mirror structure (e.g., 244a, 254a) is positioned over the aligned optical partially reflective mirror structures 214a, 224a, 234a. In this way, each optical partially reflective mirror structure 244a. 254a at least partially deflects the deflected light beam 281 perpendicularly into the lateral plane of the designation die to proceed as a horizontally deflected signal 281c, 281d through an optical waveguide 244, 254, and to the destination optical modulator module 243, 253 which encodes information onto the received unmodulated laser signal 281c, 281d. The resulting modulated optical signal 293, 294 generated by the modulator 243, 253 is then transmitted through a corresponding output optical waveguide 248, 259 to a corresponding output optical mirror structure 248a, 259a which perpendicularly deflects the signal 293, 294 to proceed through an optical TSVs and routing structures in the substrate 241, 251 and underlying die 220, 230 to the corresponding output optical mirror structure 218a, 219a for perpendicular deflection along the connected output optical waveguide 218, 219 for output from the optical source die 210. In other embodiments where a single laser source 213 is shared by the receiving die 220, 230, 240, 250, the output optical waveguide structures from the different receiver modulators may share a common output optical waveguide by controlling the signaling from each receiver modulator to access the common output optical waveguide during non-conflicting time slots, such as by using a time-division multiplexing or shared bus arrangement to separate convey modulated optical signals over the common output optical waveguide for output. In other embodiments, the common output optical waveguide may be used to route the modulated output signals to a processor, where the processor may control the signaling from each receiver modulator to access the common output optical waveguide. In addition, the processor may be located on the same die as the laser diode (e.g., the first die 210) or on another die.

As described above, the assembled die stack 210, 220, 230, 240, 250 may be attached to the system board 200 in a protective packaging or housing 260 which completely surrounds and encases the die stack to seal and protect the die from moisture, contamination, corrosion, and mechanical shock, such as by applying, transfer molding, injection molding, or otherwise forming a protective layer to seal the die stack. As a result, any modulated optical signal 291-294 that is to be routed to an external destination (e.g., another die stack) must be able to penetrate the packaging structure 260. To this end, a number of packaging arrangements may be used. For example, the packaging structure 260 may be formed with a transparent mold compound or other packaging material that permits a modulated optical signal 291-294 to establish a point-to-point optical signal connection to an external optical signal receiver. In other embodiments where the packaging structure 260 is formed with a conventional or opaque mold compound or packaging material, the packaging structure 260 may include a transparent insert structure 262, such as by inserting a solid transparent rod 262 to hold the die stack in place during injection molding or transfer molding so that the mold compound forms around the solid transparent rod 262 to provide a transparent output optical signal path for modulated optical signals 291-294 from the packaged die stack. In yet other embodiments, the packaging structure 260 may include a transparent film or layer 264 formed on a sidewall surface of the packaging structure 260 to provide a transparent output optical signal path for modulated optical signals 291-294 from the packaged die stack, in which case the transparent insert structure 262 is not required. With a transparent film or layer 264 formed along each of the stacked die, the modulated optical signals 291-294 generated at each die 220, 230, 240, 250 may be directly output without requiring routing to the first optical source die 210. In yet other embodiments, a plurality of die stacks may be encased in a single package which has a separate optical output port for each die stack, such as by forming the package with a transparent material, transparent insert structures, or transparent film layer to provide a clear optical signal output path from each die stack. In other embodiments the multiple die stacks are not encapsulated and the die stack assembly as a whole may filled with an inert gas and sealed.

As illustrated in FIGS. 5-6, the optical source die 210 includes mirror structures for perpendicularly deflecting optical signals into and out of the lateral plane of the die 210. To illustrate an example fabrication sequence for forming an integrated circuit die with an out-of-plane optical mirror for deflecting optical signals into and/or out of the plane of the integrated circuit die, reference is now made to FIGS. 7-16 which illustrate partial cutaway side views of various stages in the production of an integrated circuit die including one or more optical mirrors for transitioning optical signals perpendicularly to the plane of the die in accordance with selected example embodiments. Though the various structures, openings, recesses, and layer regions are illustrated in simplified form with straight lines and corner regions, it will be appreciated that the actual profile(s) for the different structures, openings, recesses, and layer regions will not necessarily conform to simplified depictions, but will instead depend on the specific fabrication process(es) used. For example, selected etch processes may result in curved corner profiles or undercut features. In addition, certain epitaxial or thermal oxidation processes may alter the profile of the resulting layers, depending on a variety of processing factors.

Figure 7:
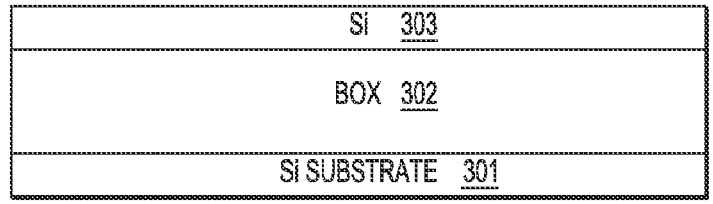
FIGS. 7-16 illustrate partial cutaway side views of various stages in the production of an integrated circuit die including an optical mirror according to a first example embodiment of the present disclosure.

Referring first to FIG. 7, there is shown a partial cutaway side view of a semiconductor wafer structure formed as a starting stack with a plurality of substrate layers 301-303. In selected embodiments, the wafer structure includes a substrate 301 that may be formed with monocrystalline silicon, though other materials may be used for the substrate layer 301. For example, the substrate 301 may be formed as a bulk semiconductor substrate or other substrate in which one or more additional semiconductor layers and/or well regions are formed using epitaxial semiconductor growth and/or selective doping techniques as described more fully hereinbelow. In addition, the substrate 301 may be a semiconductor-on-insulator (SOI) type substrate which includes a semiconductor substrate, buried insulator layer formed over the substrate, and p-type semiconductor substrate layer formed over the buried insulator or oxide layer (not shown). Alternatively, the semiconductor substrate 301 may be implemented as a bulk silicon substrate, single crystalline silicon (doped or undoped). SOI substrate, or any semiconductor material including, for example. Si, SiC, SiGe, SiGeC. Ge, GaAs, InAs, InP, as well as other III/V or II/VI compound semiconductors or any combination thereof.

On the substrate layer 301, an oxide layer or other dielectric material may be formed by depositing or thermally growing one or more silicon oxide layers to form a buried oxide layer having a predetermined thickness (e.g., approximately 1000 nm, though other materials and thicknesses could be used provided that required waveguide properties are obtained. In selected embodiments, the buried oxide layer 302 is a layer of silicon dioxide that is deposited with a chemical vapor deposition (CVD) or thermal deposition over the wafer substrate layer 301, followed by a planarization (e.g., a chemical mechanical polish (CMP)) if required. On the oxide layer 302, a silicon substrate layer 303 is formed. In selected embodiments, the silicon substrate layer 303 may be formed by epitaxially growing monocrystalline silicon or depositing polysilicon using any desired CVD or thermal deposition process to a predetermined thickness (e.g., 1000 nm) which is controlled to define the subsequently formed in-plane optical beam structure. However, in selected embodiments, the substrate layer 303 may be formed with a layer of silicon having a predetermined crystallographic orientation (e.g., <100> or <110>). As will be appreciated, the starting stack of substrate layers 301-303 may be formed as a semiconductor-on-insulator (SOI) substrate wafer structure in which the silicon substrate layer 303 and underlying substrate layer 301 are bonded together to include a buried oxide layer 302. In selected embodiments, holes (not shown) formed in oxide layer 302 and opening to wafer substrate layer 301 may be used to allow wafer substrate layer 301 as a seed layer for epitaxial growth of silicon substrate layer 303.

Figure 8:
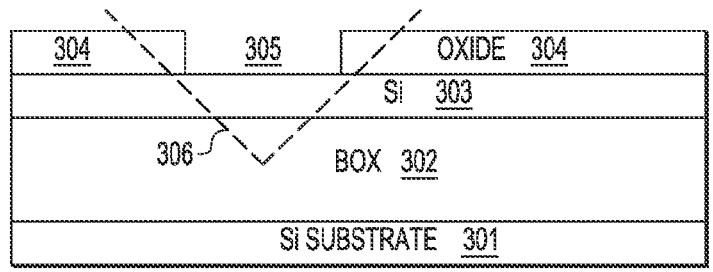

FIG. 8 illustrates processing of the semiconductor wafer structure subsequent to FIG. 7 with a partial cutaway side view after a patterned oxide hardmask 304 is formed over the silicon substrate layer 303. In selected embodiments, the patterned oxide hardmask 304 may be formed on the substrate layer 303 by depositing silicon oxide or another appropriate dielectric material to a predetermined thickness (e.g., 1000 nm) using a CVD or thermal deposition process, alone or in combination with a planarization or polish step. Using a mask of photo resist or other masking material (not shown) formed on the oxide layer 304, one or more portions of the oxide layer 304 may be patterned and etched to form a patterned oxide hardmask 304 to selectively expose the silicon substrate layer 303 with a one or more etched openings 305. For example, the opening(s) 305 may be formed by patterning openings in layer 304 (e.g., using a photolithographic process) and etching the deposited oxide layer 304 with appropriate anisotropic etch chemistries (e.g., $CHF_3$, $C_2F_6$, or $C_4F$ and argon gas) for etching silicon dioxide. Other similar mixtures of fluorocarbons (with or without hydrogen) may be used to etch the silicon dioxide. As described more fully hereinbelow, the width and location of the opening(s) 305 in the patterned oxide hardmask 304 are controlled to define a silicon etch opening which will produce the desired angled silicon etch surfaces 306 where the deflection surfaces of the mirror structures are finally formed.

Figure 9:
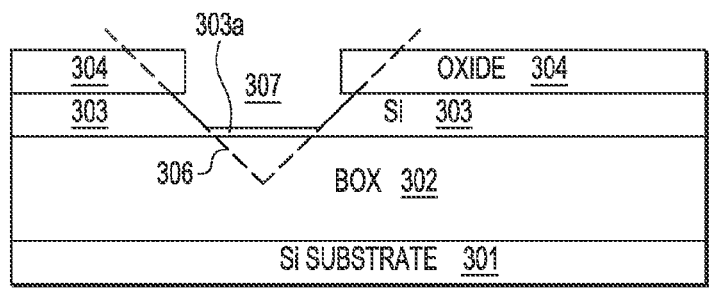

FIG. 9 illustrates processing of the semiconductor wafer structure subsequent to FIG. 8 with a partial plan view after portions of the silicon substrate layer 303 have been directionally etched to form one or more etched silicon openings 307 with angled sidewalls or etch surfaces 306 where the deflection surfaces of the mirror structures are finally formed. By exploiting the crystallographic orientation of the silicon substrate layer 303, a selectively oriented silicon wet etch or dry etch process may be applied to form the silicon etch opening 307 which will produce the desired angled silicon etch surfaces. For example, the exposed silicon substrate layer 303 can be etched in a controlled fashion with a silicon orientation-dependent wet etch process to produce well-defined V-grooves 307 having 45 degree surfaces. Example wet anisotropic etch processing details are shown in C. Strandman et al., "Fabrication of 45° Mirrors Together with Well-Defined V-Grooves Using Wet Anisotropic Etching of Silicon," J. Microelectromechanical Systems, Vol. 4, No. 4, pp. 213-219 (December 1995), which is incorporated by reference as if fully set forth herein. Several anisotropic wet etchants are available for anisotropic silicon etching, all of them hot aqueous caustics. For instance, potassium hydroxide (KOH) displays an etch rate selectivity 400 times higher in <100> crystal directions than in <111> directions. In addition, an aqueous solution of ethylene diamine and pyrocatechol (EDP) displays a <100>/<111> selectivity of 17× without etching silicon dioxide while also displaying high selectivity between lightly doped and heavily boron-doped (p-type) silicon. Tetramethylammonium hydroxide (TMAH) presents a safer alternative than EDP, with a 37× selectivity between {100} and {111} planes in silicon. Other angled silicon etch processes include Hydrazine ($N_2H_4$) and Cesium hydroxide (CsOH), etc. These etch techniques may be used to reveal {100} planes on a <111> silicon substrate layer 303. While the applied silicon etch process may etch completely through the silicon substrate layer 303 to expose the underlying buried oxide layer 302, in other embodiments, the silicon etch process may be applied as a timed etch process to leave a thin layer of silicon 303a at the bottom of the etched silicon opening(s) 307 for subsequent use as a seed layer for an subsequently formed epitaxial silicon layer.

Figure 10:
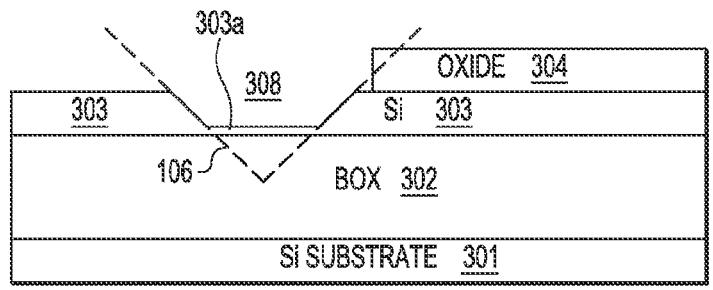

FIG. 10 illustrates processing of the semiconductor wafer structure subsequent to FIG. 9 with the partial cutaway side view after part of the of the patterned oxide hardmask 304 has been selectively removed to form an opening 308 over the region of the silicon substrate layer 303 behind the intended optical mirror region. For example, an etch mask (not shown) may be selectively formed over the wafer structure to protect the intended waveguide structure portion of the silicon substrate layer 303. With the etch mask in place, an oxide etch process may be applied to remove the exposed portion of the patterned oxide hardmask 304 and expose the silicon substrate layer 303 behind the intended optical mirror region without substantially etching the exposed silicon substrate layers 303, 303a. While any desired oxide etch process (e.g., $CHF_3$, $C_2F_6$, $C_4F_8$ and argon gas, or similar mixtures of fluorocarbons, with or without hydrogen) may be used to selectively remove part of the of the patterned oxide hardmask 304, the etch process should be controlled to retain the angled sidewalls or etch surfaces 306 of the etched silicon substrate layer 303. While the process of removing part of the patterned oxide hardmask 304 on the left side of the opening 308 may also remove a portion of the patterned oxide hardmask 304 on the right side of the opening 308 as shown in FIG. 10, it will be appreciated that it is not required to control the precise location of the patterned oxide hardmask 304 on the right side of the opening 308, other than to assist with protecting the patterned oxide hardmask 304 on the right side of the opening 308 from the subsequent oxidation processing steps. It will also be appreciated that the thin layer of silicon 303a protects the underlying buried oxide layer 302 from being removed during the oxide etch process.

Figure 11:
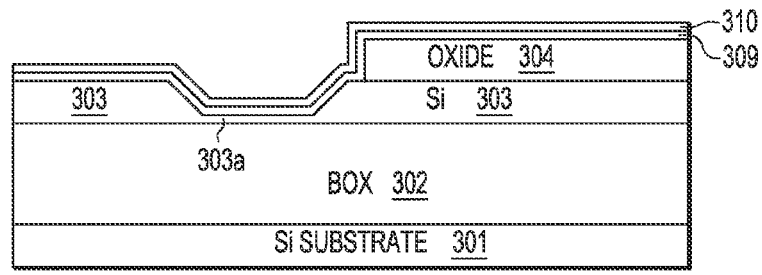

FIG. 11 illustrates processing of the semiconductor wafer structure subsequent to FIG. 10 with the partial cutaway side view after a LOCal Oxidation of Silicon (LOCOS) protection stack 309-310 is formed on the semiconductor wafer structure. In selected embodiments, the LOCOS protection stack 309-310 is formed by first depositing a thin oxide layer or pad oxide layer 309 to a predetermined thickness (e.g., approximately 1-50 nm), though other materials and thicknesses could be used. On the oxide layer 309, a silicon nitride layer 310 is formed to a predetermined thickness (e.g., approximately 30-50 nm), such as by using CVD or thermal deposition process. As will be appreciated, the LOCOS protection stack 309-310 may be formed with other materials or layers to protect any covered portion of the silicon substrate layer 303 from oxidation.

Figure 12:
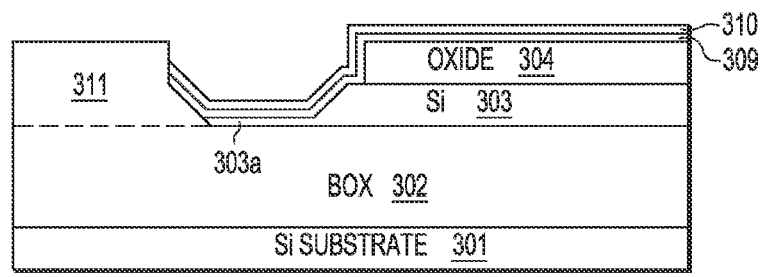

FIG. 12 illustrates processing of the semiconductor wafer structure subsequent to FIG. 11 with the partial cutaway side view after the LOCOS protection stack 309-310 is patterned and etched, and a LOCOS layer 311 is formed by oxidizing the exposed region of the silicon substrate layer 303 behind the intended optical mirror region. While any desired pattern and etch process may be used to pattern and etch the LOCOS protection stack 309-310, a photoresist mask or other masking material (not shown) may be used to pattern, develop, and etch the protection stack 309-310 to protect the intended waveguide structure portion of the silicon substrate layer 303 as well as the angled sidewalls or etch surfaces 306 of the etched silicon substrate layer 303. With the patterned LOCOS protection stack 309-310 in place, the wafer structure may be cleaned, followed by a selective oxide growth process, such as LOCOS micro-fabrication process. In accordance with conventional LOCOS processes, following cleaning and surface preparation, a thermal field oxidation process is performed to produce an oxide layer 311 on an exposed top surface of the silicon substrate layer 303. In selected embodiments, the selective oxide growth process is controlled to convert the angled sidewalls/surfaces 306 of the etched silicon substrate layer 303 into angled sidewalls/surfaces 306 of the LOCOS layer 311 which will subsequently serve as the mirror surfaces of the optical mirror structure. The selective oxide growth process may also be controlled to preserve the angled structure under the layers 309, 310, to encourage uniform oxide formation deeper into the exposed silicon layer, and to prevent bird's beak encroachment into the thin silicon layer 303a. In other embodiments, the formation of the oxide layer 311 may include patterned oxygen implants to provide oxygen into deeper portions of the silicon to promote uniform oxide formation. Though not required, the selective oxide growth process may be controlled to form the LOCOS layer 311 to be substantially co-planar with the remaining patterned oxide hardmask 304, though planarization is not required at this stage of the fabrication process. In selected embodiments, the angle of angled sidewalls or etch surfaces 306 may be modified during the etch process to compensate for the effects of the LOCOS process on angled sidewalls/surfaces 306 of the LOCOS layer 311.

Figure 13:
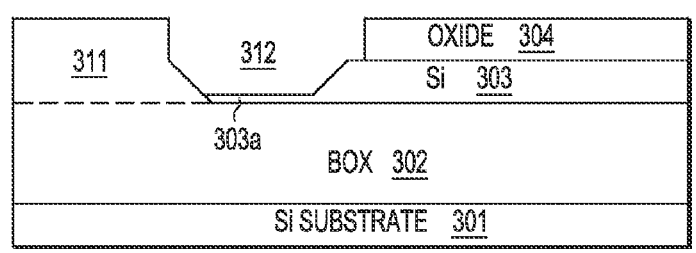

FIG. 13 illustrates processing of the semiconductor wafer structure subsequent to FIG. 12 with the partial cutaway side view after the LOCOS protection stack 309-310 is removed from the semiconductor wafer structure. While any desired film removal process may be used, in selected embodiments, the nitride layer 310 may be removed by using a hot phosphoric acid process, and the oxide layer 309 may be removed by using a dilute HF wet etch process. Once the layers of the LOCOS protection stack 309-310 are removed, there is defined a mirror structure opening 312 between the LOCOS layer 311 and the remaining patterned oxide hardmask 304 and underlying etched silicon substrate layer 303. As shown, the mirror structure opening 312 includes a first angled sidewall/surface of the LOCOS layer 311, a bottom surface of the thin silicon layer 303a, and second angled sidewall/surface of the etched silicon substrate layer 303.

Figure 14:
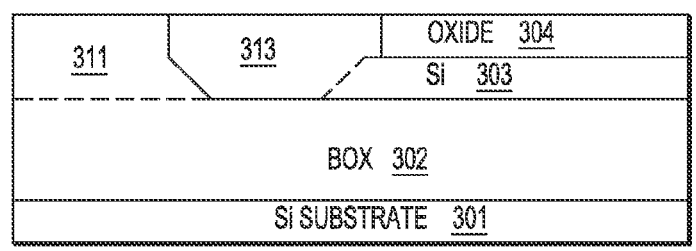

FIG. 14 illustrates processing of the semiconductor wafer structure subsequent to FIG. 13 with the partial cutaway side view after a semiconductor layer 313 is selectively formed in the mirror structure opening 312. While any desired semiconductor formation process may be used, in selected embodiments, the semiconductor layer 313 is selectively formed in the mirror structure opening 312 using an epitaxial silicon growth process. For example, using the thin silicon layer 303a as a seed layer, the semiconductor layer 313 may be selectively formed in the opening 312 without also covering the oxide layers 311, 304 by using a selective epitaxial growth of a silicon layer 313 which may be achieved by a process of chemical vapor deposition (CVD) at a chamber temperature between 400 and 900° C. in the presence of dichlorosilane, HCl, and hydrogen gas. As described herein and understood by those skilled in the art, the process of forming an epitaxial layer 313 may be described as growing an epitaxial layer, though sometimes the term "deposition" is loosely used to refer to the formation of the epitaxial layer. By selectively forming the epitaxial semiconductor layer 313 from the thin silicon seed layer 303a or remaining unetched silicon substrate layer 303, the semiconductor layer 313 has the same crystallographic orientation as the silicon substrate layer 303 used to form the waveguide structure. To remove any overgrowth of the epitaxial semiconductor layer 313, a planarization or CMP polish step may be applied to planarized the LOCOS layer 311, epitaxial semiconductor layer 313 and remaining patterned oxide hardmask 304.

At this point in the fabrication process, an integrated optical mirror structure is formed with the polished epi semiconductor layer 313 at the interface of the first angled sidewall/surface of the LOCOS layer 311 and the epitaxial semiconductor layer 313. At this interface, optical signal information transmitted through the waveguide beam structure formed by the silicon substrate layer 303 (and within the lateral plane of the semiconductor wafer structure) is deflected perpendicularly to the lateral plane of the semiconductor wafer structure to proceed through the opening of the polished epi semiconductor layer 313, and vice versa. However, given the width of the polished epi semiconductor layer 313, received optical signals should be properly aligned with the mirror interface surface 311/313. To assist with alignment of received optical signals, the size of the opening may be tuned or reduced to promote signal alignment.

Figure 15:
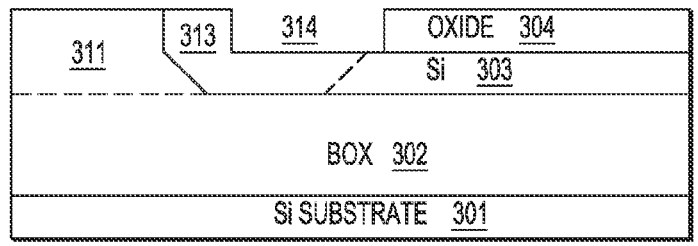

To illustrate an example technique for tuning the size of the optical mirror structure formed with the polished epi semiconductor layer 313, reference is now made to FIG. 15 illustrates processing of the semiconductor wafer structure subsequent to FIG. 14 with the partial cutaway side view after forming a recess opening 314 by selectively removing a portion of the polished epi semiconductor layer 313 remote from the mirror interface surface 311/313. In selected embodiments, the recess opening 314 is formed to a depth so that the bottom of recess 314 is coplanar with the top of the remaining etched silicon substrate layer 303. And while any desired selective removal process may be used, in selected embodiments, the recess opening 314 may be formed by patterning a mask of photo resist or other masking material (not shown) to protect the portion of the polished epi semiconductor layer 313 over the mirror interface surface 311/313 and expose the portion of epi layer 313 that is remote from the mirror interface surface 311/313. The unmasked epi layer 313 are removed by etching with appropriate etch chemistries, such as an anisotropic timed etch that is selective with respect to the masking material. For example, a chlorine containing etch chemistry or more generally a halogen containing etch chemistry maybe used, but other etch chemistries for etching silicon may be used.

Figure 16:
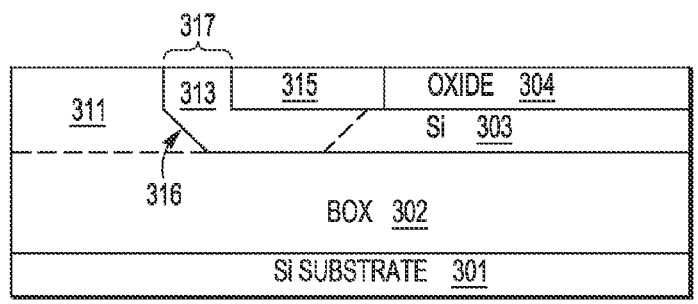

FIG. 16 illustrates processing of the semiconductor wafer structure subsequent to FIG. 15 with the partial cutaway side view after a dielectric layer 315 is formed in the recess opening 314. In selected embodiments, the dielectric layer 315 is formed by depositing silicon dioxide with a CVD or thermal deposition process at a sufficient thickness to fill the recess opening, followed by a planarization or CMP of the wafer structure. As a consequence of the foregoing fabrication sequence, an integrated optical mirror structure is formed with the polished epi semiconductor layer 313 having a reduced or tuned opening 317 above the mirror interface surface 311/313. Through this opening 317, optical signal information that is received through the opening 317 in a perpendicular transmission path (to the lateral plane of the semiconductor wafer structure) is deflected perpendicularly into the lateral plane of the semiconductor wafer structure to proceed through the waveguide beam structure formed by the silicon substrate layer 303 (and within the lateral plane of the semiconductor wafer structure).

As will be appreciated, it may be possible to eliminate the processing steps for tuning the size of the optical mirror structure (described in FIGS. 15-16) by limiting the width of the opening 305 in the patterned oxide hardmask 304 (and the resulting width of the silicon etch opening 307). In this scenario, the epi layer 313 formed in the silicon etch opening 312 provides adequate alignment to the mirror interface surface 311/313 without additional processing to tune its width.

To illustrate another example fabrication sequence for forming an integrated circuit die with out-of-plane optical mirrors, reference is now made to FIGS. 17-24 which illustrate partial cutaway side views of various stages in the production of an integrated circuit die including one or more optical mirrors for transitioning optical signals perpendicularly to the plane of the die. Generally speaking, FIGS. 17-24 illustrate a similar processing sequence to that shown in FIGS. 7-16, but instead of forming a LOCOS layer from an exposed silicon substrate layer, the exposed silicon substrate layer is only partially oxidized to form the half-mirror structure.

Figure 17:
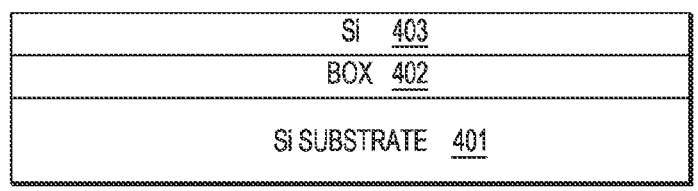
FIGS. 17-24 illustrate partial cutaway side views of various stages in the production of an integrated circuit die including an optical mirror according to a second example embodiment of the present disclosure.

Referring first to FIG. 17, there is shown a partial cutaway side view of a semiconductor wafer structure formed as a starting stack with a plurality of substrate layers 401-403. In selected embodiments, the wafer structure includes a bulk silicon substrate 401 formed with monocrystalline silicon, though other materials may be used. On the substrate layer 401, a buried oxide or dielectric layer 402 may be formed by depositing and/or thermally growing silicon oxide to a predetermined thickness, though other materials and thicknesses could be used. On the buried oxide layer 402, a semiconductor substrate layer 403 is formed. In selected embodiments, the semiconductor substrate layer 403 may be formed by epitaxially growing monocrystalline silicon or depositing polysilicon using any desired CVD or thermal deposition process, alone or in combination with a planarization or polish step. When formed as monocrystalline silicon, the silicon substrate layer 403 may have a predetermined crystallographic orientation (e.g., <100> or <110>) that is formed to a predetermined thickness (e.g., 1000 nm) which is controlled to define the subsequently formed waveguide beam structure for conveying optical signal in the plane of the wafer substrate.

Figure 18:
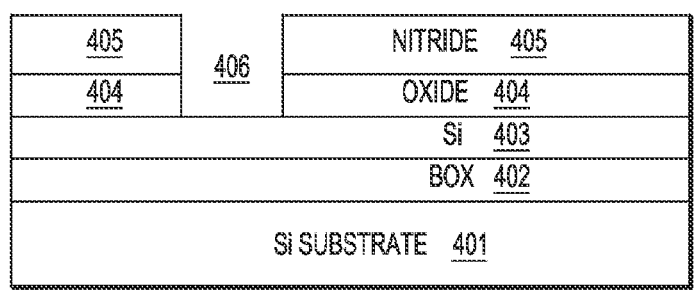

FIG. 18 illustrates processing of the semiconductor wafer structure subsequent to FIG. 17 with the partial cutaway side view after a patterned etch mask 404-405 is formed on the semiconductor wafer structure using a trench etch process to expose the buried oxide layer 402. In selected embodiments, the patterned etch mask 404-405 is formed by first depositing an oxide layer 404 to a predetermined thickness (e.g., approximately 1000 nm), though other materials and thicknesses could be used, provided that sufficient waveguide performance requirements are met. On the oxide layer 404, a silicon nitride layer 405 is formed to a predetermined thickness (e.g., 30-100 nm), such as by using CVD or thermal deposition process. Of course, the etch mask layers 404-405 may be formed with other materials or layers. However formed, the etch mask layers 404-405 are then patterned and trench etched with one or more anisotropic etch processes to define an opening 406 which exposes the underlying semiconductor substrate layer 403 over the intended optical mirror region. While any desired pattern and trench etch process may be used, a photoresist mask or other masking material (not shown) may be used to pattern, develop, and etch the etch mask 404-405 to form the trench opening 406 and to protect the intended waveguide beam waveguide structure portions of the silicon substrate layer 403. As described herein, the width and location of the trench opening(s) 406 in the patterned etch mask 404-405 are controlled to define a silicon etch opening which will produce the desired angled silicon etch surfaces where the deflection surfaces of the mirror structures are finally formed.

Figure 19:
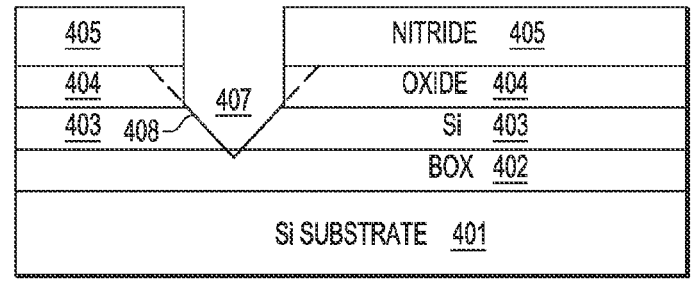

FIG. 19 illustrates processing of the semiconductor wafer structure subsequent to FIG. 18 with a partial plan view after portions of the silicon substrate layer 403 have been directionally etched to form one or more etched silicon openings 407 with angled sidewalls or etch surfaces 408 where the deflection surfaces of the mirror structures are finally formed. The directional etching may apply a selectively oriented silicon wet etch or dry etch process that exploits the crystallographic orientation of the silicon substrate layer 403, thereby forming the silicon etch opening 407 which will produce the desired angled silicon etch surfaces. Examples of silicon orientation-dependent wet etch process that can produce well-defined V-grooves 407 having 45 degree surfaces include various anisotropic wet etchants, such as KOH, EDP, TMAH, $N_2H_4$, or CsOH wet etch processes.

Figure 20:
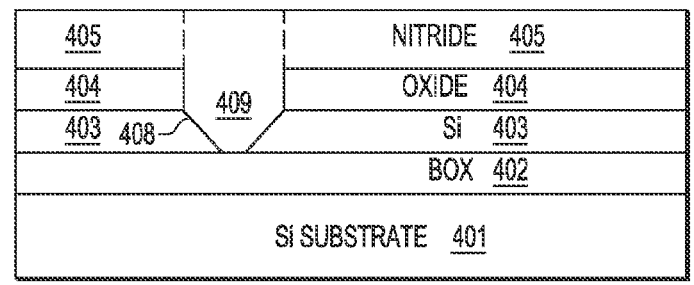

FIG. 20 illustrates processing of the semiconductor wafer structure subsequent to FIG. 19 with the partial cutaway side view after a dielectric fill layer 409 is formed in the etched silicon opening(s) 407. In selected embodiments, the dielectric layer 409 is formed by depositing silicon nitride with a CVD or thermal deposition process at a sufficient thickness to fill the etched silicon opening(s) 407, followed by a planarization or CMP of the wafer structure. As a consequence of the dielectric fill sequence, both angled silicon etch surfaces of the etched semiconductor substrate layer 403 are covered and protected by the dielectric fill material 409. In selected embodiments, a very thin pad oxide may be deposited to a predetermined thickness (e.g., approximately 1-5 nm) before the silicon nitride to facilitate proper adhesion. However, the oxide should be selected so that its removal during subsequent process steps does not hinder the optical mirror structures.

Figure 21:
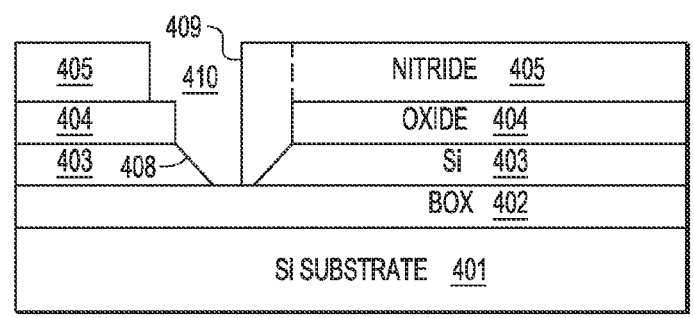

FIG. 21 illustrates processing of the semiconductor wafer structure subsequent to FIG. 20 with the partial cutaway side view after a portion of at least the dielectric fill material 409 (and possibly part of the nitride layer 405) is removed to expose at least one of the angled silicon etch surfaces 408 of the etched semiconductor substrate layer 403. While any desired pattern and etch process may be used to pattern and etch the dielectric fill material 409, a photoresist mask or other masking material (not shown) may be used to pattern, develop, and etch the dielectric fill material 409 to form an opening 410 that exposes one or more of the angled sidewalls or etch surfaces 408 of the etched silicon substrate layer 403 in the intended optical mirror region. And while only a single angled silicon etch surfaces 408 is shown as being exposed, it will be appreciated that both of the angled silicon etch surfaces can be exposed by the opening 410 in embodiments where two partially reflective mirror structures are being formed.

Figure 22:
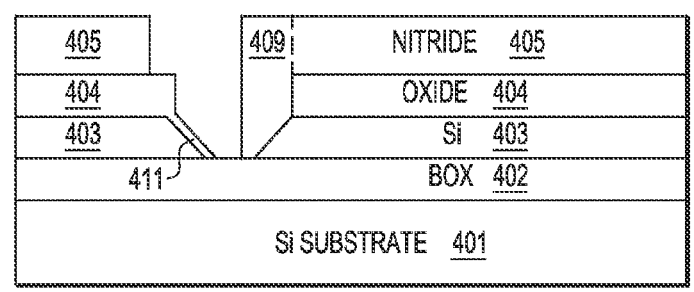

FIG. 22 illustrates processing of the semiconductor wafer structure subsequent to FIG. 21 with the partial cutaway side view after an oxide layer 411 is formed on the exposed angled silicon etch surface 408. In selected embodiments, the oxide layer 411 may be deposited or thermally grown to convert the exposed surface of the angled silicon etch surface 408 into silicon dioxide having a predetermined thickness (e.g., approximately 10-500 Angstroms) that is suitable for forming a half-mirror structure while otherwise retaining the remainder of the etched semiconductor substrate layer 403. However, it will be appreciated that the oxide layer 411 may be formed with any desired technique used, such as chemical vapor deposition (CVD) techniques, physical vapor deposition (PVD) techniques, atomic layer deposition (ALD) techniques, or any other technique for depositing or growing an oxide layer 411. In selected embodiments, a multilayer structure of overlapping silicon oxide and silicon layers may be used to form the half-mirror structure. In other selected embodiments, other materials and thicknesses may be used to construct the multilayer structure.

Figure 23:
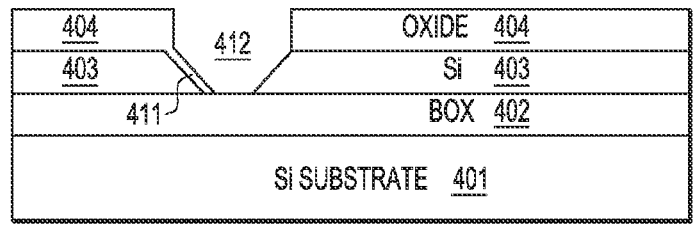

FIG. 23 illustrates processing of the semiconductor wafer structure subsequent to FIG. 22 with the partial cutaway side view after the remaining dielectric fill material 409 and nitride layer 405 are removed from the semiconductor wafer structure. While any desired film removal process may be used, in selected embodiments, the nitride layers 405, 409 may be removed by using a hot phosphoric acid process. If desired, a planarization or CMP process may be applied to planarize the exposed oxide hardmask layers 404. Once the nitride layers 405, 409 are removed (and polished), there is defined a mirror structure opening 412 between the remaining patterned oxide hardmask 404, oxide layer 411, and underlying etched silicon substrate layers 403. As shown, the mirror structure opening 412 includes a first angled sidewall/surface formed with the oxide layer 411, a bottom surface of the buried oxide 402, and second angled sidewall/surface of the etched silicon substrate layer 403.

Figure 24:
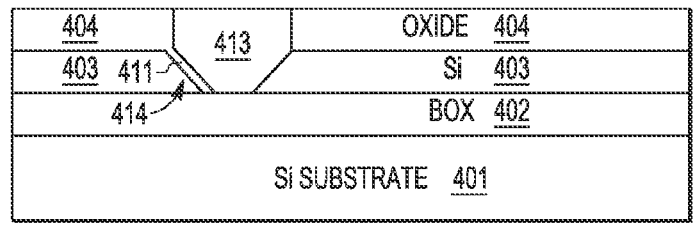

FIG. 24 illustrates processing of the semiconductor wafer structure subsequent to FIG. 23 with the partial cutaway side view after a semiconductor layer 413 is selectively formed in the mirror structure opening 412. While any desired semiconductor formation process may be used, in selected embodiments, the semiconductor layer 413 is selectively formed by epitaxially growing silicon in the mirror structure opening 412, such as by using a selective epitaxial growth of a silicon layer 413 from the exposed second angled sidewall/surface of the etched silicon substrate layer 403 second angled sidewall/surface of the etched silicon substrate layer 403. By selectively forming the epitaxial semiconductor layer 413 from the etched silicon substrate layer 403, the semiconductor layer 413 has the same crystallographic orientation as the silicon substrate layer 403 used to form the waveguide beam structure. To remove any overgrowth of the epitaxial semiconductor layer 413, a planarization or CMP polish step may be applied to the wafer structure. The half-mirror structure 414 allows light in the waveguide formed in epitaxial semiconductor layer 413 to be deflected perpendicularly into the lateral plane of the semiconductor wafer structure to proceed through the waveguide beam structure formed by the silicon substrate layer 403. The half-mirror structure 414 also allows the portion of the light not deflected to remain with the waveguide beam structure formed by the silicon substrate layer 403.

As illustrated in FIGS. 5-6, one or more of the stacked die 220, 230, 240, 250 may include partially reflective mirror structures for receiving optical signals from the first optical source die 210 and at least partially deflecting them perpendicularly into and out of the lateral plane of the respective die, thereby allowing part of the optical signal from the first optical source die 210 to proceed to additional die in the die stack. To illustrate another example fabrication sequence for forming an integrated circuit die with a partially reflective optical mirror for perpendicularly deflecting optical signals into and/or out of the plane of the integrated circuit die, reference is now made to FIGS. 25-35 which illustrate partial cutaway side views of various stages in the production of an integrated circuit die including one or more optical through-silicon via half-mirror structures for transitioning optical signals perpendicular to the plane of the optical die. Generally speaking, the processing sequence shown in FIGS. 25-35 forms a half-mirror structure over a through-silicon via (TSV) by forming one or more half-mirror layers over an angled interface of the TSV to form a combination half-mirror for both the optical TSV and lateral waveguide beam structures.

Figure 25:
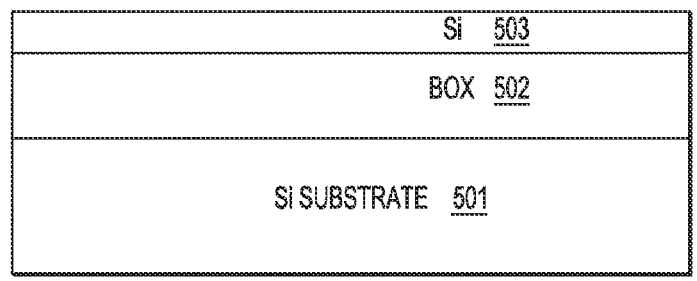
FIGS. 25-35 illustrate partial cutaway side views of various stages in the production of an integrated circuit die including an optical through silicon via with a partially reflective mirror according to a third example embodiment of the present disclosure.

Referring first to FIG. 25, there is shown a partial cutaway side view of a semiconductor wafer structure formed as a starting stack with a plurality of substrate layers 301-303. While a bulk silicon substrate 501 may be formed with monocrystalline silicon, other materials may be used. On the substrate layer 501, a buried oxide or dielectric layer 502 having a predetermined thickness may be formed with silicon oxide, though any desired materials or thickness could be used. On the buried oxide layer 502, a semiconductor substrate layer 503 is formed, such as by epitaxially growing monocrystalline silicon or depositing polysilicon using any desired CVD or thermal deposition process, alone or in combination with a planarization or polish step. When formed as monocrystalline silicon, the silicon substrate layer 503 may have a predetermined crystallographic orientation (e.g., <100> or <110>) that is formed to a predetermined thickness which is controlled to define the subsequently formed waveguide beam structure for conveying optical signal in the plane of the wafer substrate. As will be appreciated, the semiconductor wafer structure may be a semiconductor-on-insulator (SOI) type substrate which includes a semiconductor substrate 501, buried insulator layer 502 formed over the substrate, and p-type semiconductor substrate layer 503 formed over the buried insulator or oxide layer 502.

Figure 26:
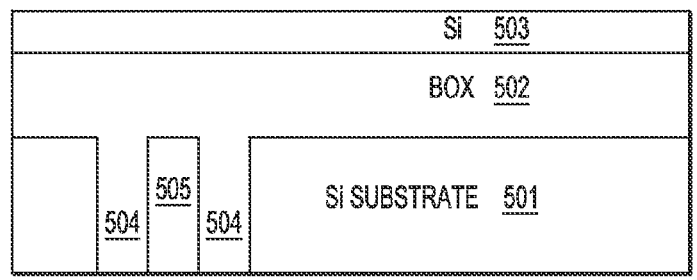

FIG. 26 illustrates processing of the semiconductor wafer structure subsequent to FIG. 25 with the partial cutaway side view after one or more backside optical TSV structures 505. In selected embodiments, the optical TSV structure 505 may be formed with a backside TSV process which forms a cylindrical oxide region 504 on the backside of the wafer structure extending to the buried oxide layer 502. In the embodiment shown, the optical TSV structure 505 is formed by patterning and via etching a hollow cylinder-shaped opening through the backside of the wafer structure (e.g., by a photolithographic processes) using an anisotropic etch chemistry that etches the substrate layer 501 through to the buried oxide layer 502. The cylinder-shaped opening is then filled with a dielectric or oxide material, such as by depositing silicon dioxide with a CVD or thermal deposition process at a sufficient thickness to fill the cylinder-shaped opening, followed by a planarization or CMP of the wafer structure. The resulting cylindrical oxide region 504 surrounds and devices an optical TSV structure 505 extending from the bottom of the semiconductor substrate 501. As will be appreciated, other backside TSV processes can be used to form the optical TSV structure 505, such as epitaxially growing the optical TSV structure 505 in an etched opening of a deep trench oxide formed in the semiconductor substrate 501.

Figure 27:
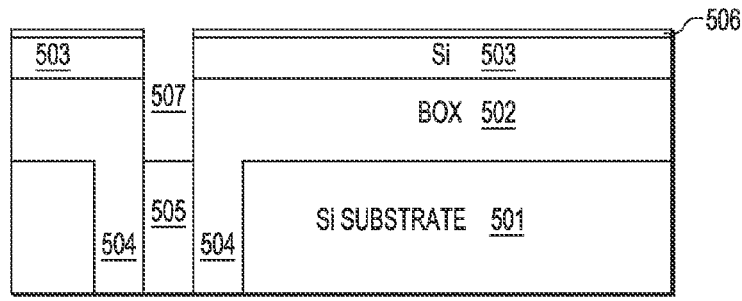

FIG. 27 illustrates processing of the semiconductor wafer structure subsequent to FIG. 26 with a partial cutaway side view after a patterned hardmask 506 is formed and portions of the silicon substrate layer 503 and buried oxide layer 504 have been anisotropically etched to form one or more etched openings 507 to expose the optical TSV structure 505. While any desired pattern and etch process may be used, the etched opening(s) 507 may be formed by depositing silicon oxide or other appropriate hardmask material(s) on the substrate layer 503 to a predetermined thickness, using a mask of photo resist or other masking material (not shown) to develop the patterned hardmask layer 506, and then applying one or more anisotropic etch processes using the patterned hardmask layer 506 as an etch mask to form one or more openings 507 in the silicon substrate layer 503 and buried oxide layer 504. The width and location of the opening(s) 507 are controlled to expose the previously formed optical TSV structure(s) 505.

Figure 28:
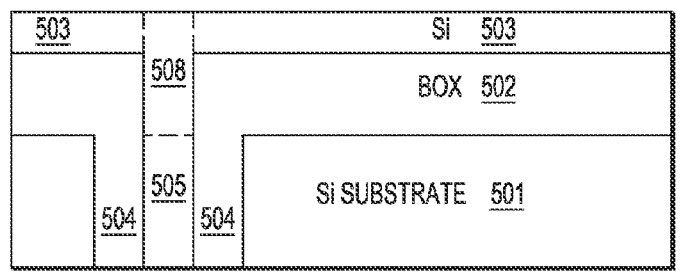

FIG. 28 illustrates processing of the semiconductor wafer structure subsequent to FIG. 27 with the partial cutaway side view after a semiconductor layer 508 is selectively formed to fill the etched opening(s) 507 and complete the optical TSV structure. As disclosed herein, the semiconductor layer 508 may be selectively formed in the etched opening(s) 507 using an epitaxial silicon growth process, though any desired semiconductor formation process may be used. By using the optical TSV structure 505 as the seed layer for a selective epitaxial growth process, the semiconductor layer 508 may be selectively formed in the opening 507 without also covering the semiconductor substrate layers 503, thereby forming an epitaxial semiconductor layer 508 having the same crystallographic orientation as the optical TSV structure 505. To remove any overgrowth of the epitaxial semiconductor layer 508 and the patterned hardmask 506, a planarization or CMP polish step may be applied to the wafer substrate.

Figure 29:
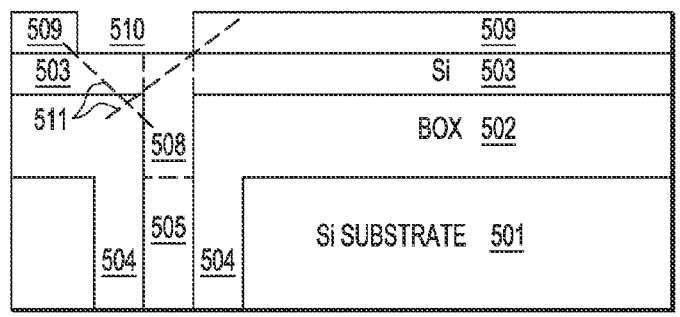

FIG. 29 illustrates processing of the semiconductor wafer structure subsequent to FIG. 28 with a partial cutaway side view after a patterned oxide hardmask 509 is formed over the silicon substrate layer 503. As disclosed herein, the patterned oxide hardmask 509 may be formed by growing and/or depositing silicon oxide or another appropriate dielectric material on the silicon substrate layer 503 to a predetermined thickness using any desired oxide formation process, alone or in combination with a planarization or polish step. Using a mask of photo resist or other masking material (not shown), one or more portions of the oxide hardmask layer 509 may be patterned and etched to form the patterned oxide hardmask 509 with one or more etched openings 510. As disclosed herein, the width and location of the opening(s) 510 in the patterned oxide hardmask 509 are controlled to expose at least part of the silicon substrate layer 503 (which will serve as an epitaxial growth seed layer) and to expose the top of the semiconductor layer 508 from the optical TSV structure. In addition, the width and location of the opening(s) 510 are controlled to define a silicon etch opening which will produce the desired angled silicon etch surfaces 511 to provide deflection surfaces of the subsequently formed mirror structures.

Figure 30:
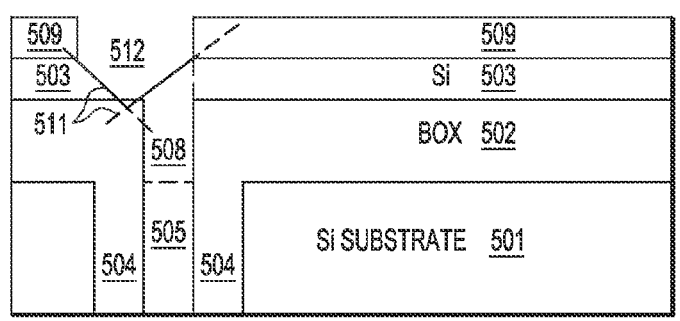

FIG. 30 illustrates processing of the semiconductor wafer structure subsequent to FIG. 29 with a partial plan view after portions of the silicon substrate layer 503 and epi semiconductor layer 508 have been directionally etched to form one or more etched silicon openings 512 with angled sidewalls or etch surfaces 511 where the deflection surfaces of the mirror structures are finally formed. The directional etching may apply a selectively oriented silicon wet etch or dry etch process that exploits the crystallographic orientation (e.g., of the silicon layers 508, 503, thereby forming the silicon etch opening 510 which will produce the desired angled silicon etch surfaces. Examples of silicon orientation-dependent wet etch process that can produce well-defined V-grooves 510 having 45 degree surfaces include various anisotropic wet etchants, such as KOH, EDP, TMAH. $N_2H_4$, or CsOH wet etch processes. These etch techniques may be used to reveal {100} planes on a <111> silicon layer 508. While the applied silicon etch process may etch only partially through the silicon substrate layer 503 without exposing the underlying buried oxide layer 502, in other embodiments, the silicon etch process may be applied as a timed etch process to position the angled silicon etch surface of the silicon layer 508 to intersect with the top of the buried oxide layer 502 for improved positioning of the subsequently formed optical TSV half-mirror structure(s).

Figure 31:
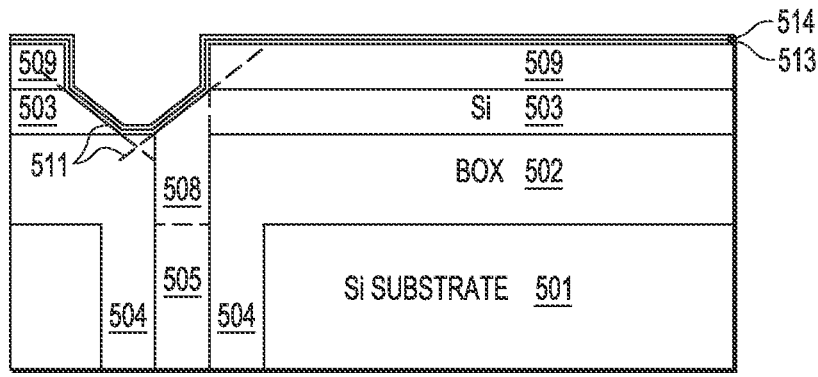

FIG. 31 illustrates processing of the semiconductor wafer structure subsequent to FIG. 30 with the partial cutaway side view after one or more dielectric mirror layers 513-514 are formed on the semiconductor wafer structure. In selected embodiments, the dielectric mirror layer stack 513-514 is formed over the patterned oxide hardmask 509 and in the etched silicon opening(s) 512 by first depositing a thin oxide layer or pad oxide layer 513 to a predetermined thickness on the semiconductor wafer structure. On the oxide layer 513, a silicon nitride layer 514 is formed to a predetermined thickness by using CVD or PVD process. As will be appreciated, the dielectric mirror layer stack 513-514 may be formed with other materials or layers to protect any covered silicon layers from epitaxial growth processing. In addition, the materials used to form the dielectric mirror layer stack 513-514 should have suitable light deflection properties required for a half-mirror structure.

As an alternative to forming the dielectric mirror layer stack 513-514, a thermal oxide growth process may be performed to produce an oxide layer on at least the angled silicon etch surface of the silicon layer 508. In these embodiments, the thermally grown oxide layer formed on the exposed surface of the angled silicon etch surface 508 has a predetermined thickness (e.g., approximately 10-500 Angstroms) that is suitable for forming a half-mirror structure. In other embodiments, a full mirror structure may be formed by forming one or more dielectric mirror stack layers 513-514 to a sufficient thickness on the angled silicon etch surface 508 to fully reflect any optical signal from the optical TSV structure 505, 508 to the silicon substrate layer 503 on the right side, and vice versa.

Figure 32:
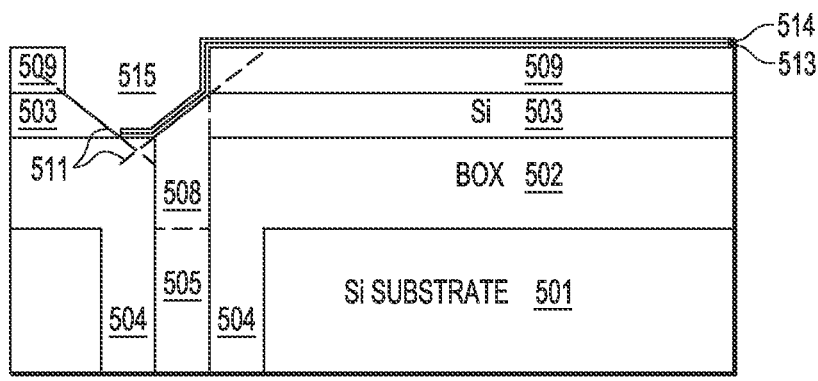

FIG. 32 illustrates processing of the semiconductor wafer structure subsequent to FIG. 31 with the partial cutaway side view after the dielectric mirror layer stack 513-514 is patterned and etched to form an opening 515 which exposes part of the silicon substrate layer 503 for use as an epitaxial growth seed layer while retaining the dielectric mirror layer(s) 513-514 over the angled silicon etch surface 508. While any desired pattern and etch process may be used to form the opening 515, a photoresist mask or other masking material (not shown) may be used to pattern, develop, and etch the dielectric mirror layer stack 513-514 to expose the angled sidewalls or etch surfaces 511 of the etched silicon substrate layer 503.

Figure 33:
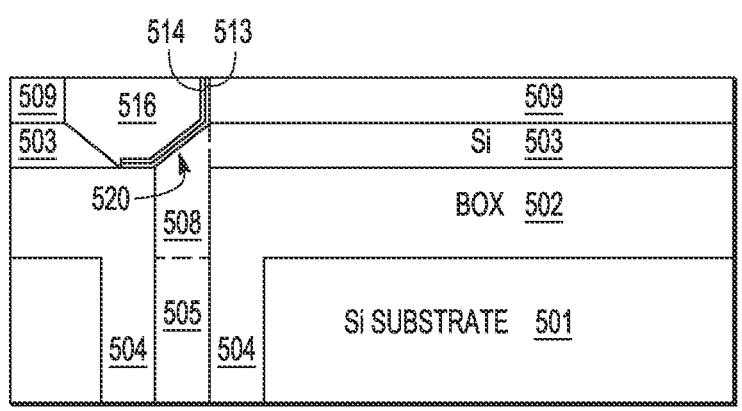

FIG. 33 illustrates processing of the semiconductor wafer structure subsequent to FIG. 32 with the partial cutaway side view after a semiconductor layer 516 is selectively formed to fill the etched opening(s) 515 and cover the patterned dielectric mirror layer(s) 513-514 formed over the optical TSV structure. As disclosed herein, the semiconductor layer 516 may be selectively formed using an epitaxial silicon growth process, though any desired semiconductor formation process may be used. By using the patterned dielectric mirror layer(s) 513-514 to prevent epitaxial growth from the epi semiconductor layer 508, the retained patterned dielectric mirror layer(s) 513-514 cover the optical TSV structure 505, 508 with one or more dielectric layers that are suitable for forming a half-mirror structure. To remove any overgrowth of the epitaxial semiconductor layer 516 on the patterned hardmask 509, a planarization or CMP polish step may be applied to the wafer substrate.

At this point in the fabrication process, an integrated optical half-mirror structure 520 is formed with the patterned dielectric mirror layer(s) 513-514 at the interface of the angled silicon etch surface 508 and the epitaxial semiconductor layer 516. At this interface, optical signal information transmitted through the waveguide beam structure formed by the silicon substrate layer 503 (and within the lateral plane of the semiconductor wafer structure) is deflected by the half-mirror structure 520 to proceed perpendicularly to the lateral plane of the semiconductor wafer structure and through the opening of the polished epi semiconductor layer 516. In addition, optical signal information transmitted through the optical TSV structure 505, 508 may also proceed through half-mirror structure 520 and out through the opening of the polished epi semiconductor layer 516. However, given the width of the polished epi semiconductor layer 516, received optical signals should be properly aligned with the half-mirror interface surface 520 on the angled silicon etch surface 508. To assist with alignment of received optical signals, the size of the opening may be tuned or reduced to promote signal alignment.

Figure 34:
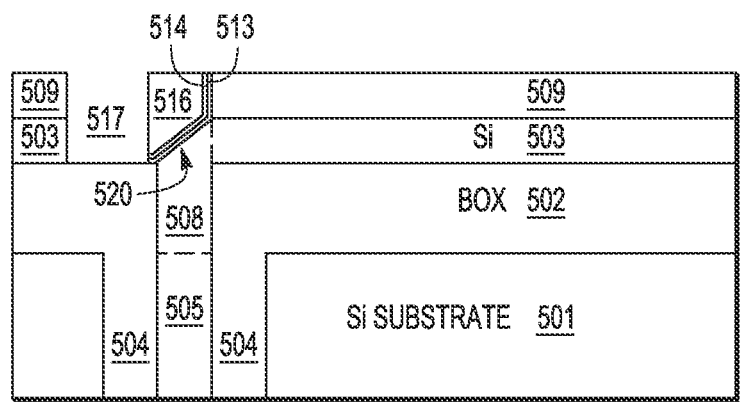

To illustrate an example technique for tuning the size of the optical half-mirror structure formed with the half-mirror structure 520, reference is now made to FIG. 34 illustrates processing of the semiconductor wafer structure subsequent to FIG. 33 with the partial cutaway side view after forming a recess opening 517 by selectively removing the portion of the (polished) epi semiconductor layer 516 not located above the mirror interface surface 520. In selected embodiments, the recess opening 517 is formed to a depth so that the bottom of recess 517 is coplanar with the top of the buried oxide layer 502. And while any desired selective removal process may be used, in selected embodiments, the recess opening 517 may be formed by patterning a mask of photo resist or other masking material (not shown) to protect the portion of the (polished) epi semiconductor layer 516 over the mirror interface surface 520. The unmasked epi layer 516 is removed by etching with appropriate etch chemistries, such as an anisotropic timed etch that is selective with respect to the masking material. For example, a chlorine containing etch chemistry or more generally a halogen containing etch chemistry maybe used, but other etch chemistries for etching silicon may be used. In addition to removing a portion of the epi semiconductor layer 516, the etch process may also remove part of the dielectric mirror layer(s) 513-514 formed on the buried oxide layer 502, while retaining the dielectric mirror layer(s) 513-514 at the interface of the angled silicon etch surface 508.

Figure 35:
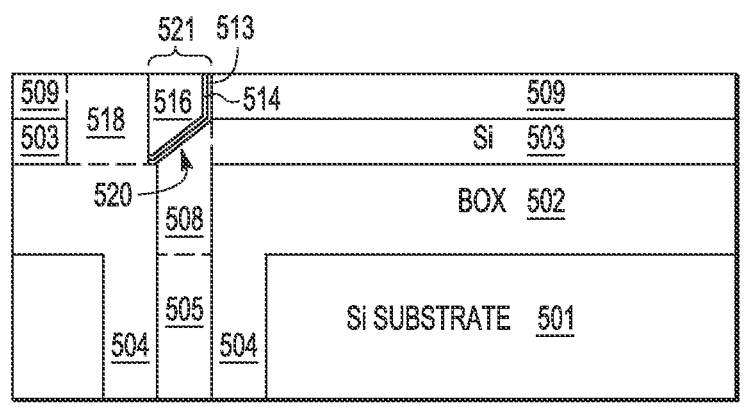

FIG. 35 illustrates processing of the semiconductor wafer structure subsequent to FIG. 34 with the partial cutaway side view after dielectric fill material 518 is formed in the recess opening 517. In selected embodiments, the dielectric layer 518 is formed by depositing silicon oxide with a CVD or thermal deposition process at a sufficient thickness to fill the etched silicon opening(s) 517, followed by a planarization or CMP of the wafer structure.

As a consequence of the foregoing fabrication sequence, an integrated optical half-mirror structure is formed with the polished epi semiconductor layer 516 having a reduced or tuned opening 521 above the half-mirror interface surface 520. Optical signal information received through this opening 521 (in a transmission path perpendicular to the lateral plane of the semiconductor wafer structure) may be partially deflected perpendicularly to proceed through the waveguide beam structure formed by the silicon substrate layer 503 (and within the lateral plane of the semiconductor wafer structure), and may partially pass through the half-mirror interface surface 520 and down through the optical TSV 505, 508. By the same token, optical signal information received through the waveguide beam structure formed by the silicon substrate layer 503 may be partially deflected perpendicularly to proceed in a transmission path perpendicular to the lateral plane of the semiconductor wafer structure and through this opening 521.

By now it should be appreciated that there is provided herein a die assembly apparatus and associated methods of fabrication and operation in which optical and electrical TSVs are used to distribute a single laser source to different die modulators. In the disclosed apparatus embodiments, there is provided a first die (e.g., a processor die) and one or more receiving die (e.g., one or more memory die and/or processor die). In selected embodiments, the first die and one or more receiving die are attached together in a die stack module. As formed, the first die includes with a laser source for generating a source unmodulated optical beam, and one or more first optical beam routing structures for optically transmitting the source unmodulated optical beam through the first die. In selected embodiments, the first optical beam routing structures at the first die include a first optical waveguide for receiving the source unmodulated optical beam from the laser source, and a first optical mirror structure for receiving the source unmodulated optical beam from the first optical waveguide and deflecting the source unmodulated optical beam as a deflected source unmodulated optical beam toward the receiving die. For example, the first optical mirror structure may be formed as an angled interface deflection surface that is offset by 45 degrees from the lateral plane of the first die for perpendicularly deflecting the source unmodulated optical beam. As formed, each receiving die includes one or more second optical beam routing structures for optically receiving at least a portion of the source unmodulated optical beam from the one or more first optical beam routing structures. In selected embodiments, the second optical beam routing structures on each receiving die include a second optical through silicon via structure for receiving the deflected source unmodulated optical beam from the first die: a second optical mirror structure for deflecting the deflected source unmodulated optical beam from the second optical through silicon via structure as a second deflected source unmodulated optical beam toward a modulator on said receiving die; and a second optical beam waveguide for transmitting the second deflected source unmodulated optical beam to the modulator on said receiving die. Each receiving die also includes a modulator for generating an output modulated optical beam of modulated monochromatic coherent light which is encoded at said modulator in response to electrical signal information. In addition, each receiving die includes one or more third optical beam routing structures for optically transmitting the output modulated optical beam signal through the receiving die. In selected embodiments, the third optical beam routing structures on each receiving die include a third optical beam waveguide for receiving the output modulated optical beam signal from the modulator on said receiving die, and a third optical mirror structure for receiving the output modulated optical beam signal from the third optical beam waveguide and deflecting the output modulated optical beam signal toward the first die. In addition, the disclosed apparatus may include a plurality of non-intersecting optical beam output routing structures for optically routing the output modulated optical beam signal from each receiving die to the first die. In selected embodiments, the first die and the receiving die are attached in a die stack that is connected to a conductor array and mounted on a system board. In addition, the die stack may be at least partially encapsulated by a packaging structure formed with mold compound. To provide a transparent output optical signal path from the packaging structure for an output laser beam signal generated by the one or more of receiving die, the packaging structure may be formed with a transparent mold compound or may include a transparent layer or insert formed in the mold compound.

In another form, there is disclosed a die stack apparatus and associated method of operation. In the disclosed methodology, an unmodulated source light beam is generated at a first die in a die stack. In addition, the unmodulated source light beam is transmitted to one or more modulators located at one or more receiving die in the die stack using one or more optical routing structures formed in the die stack. The unmodulated source light beam may be transmitted through one or more optical beam waveguides, optical through silicon via structures, and optical mirror structures formed in the die stack to route the unmodulated source light beam from the first die to the one or more modulators located at one or more receiving die. At each modulator, an information-modulated optical signal is generated from the unmodulated source light beam based on electrical signal information provided to the modulator, such as by generating a source light beam of unmodulated monochromatic coherent light at a laser source formed in the first die. In an example embodiment, the information-modulated optical signal is generated based on electrical signal information produced by the one or more receiving die (e.g., a memory or processor) in the die stack. Once the information-modulated optical signals are generated, they may be transmitted from the modulator to the first die using one or more output optical routing structures (e.g., one or more output optical beam waveguides, output optical through silicon via structures, and output optical mirror structures) formed in the die stack. In addition, the one or more information-modulated optical signals may be transmitted from the one or more modulators through a packaging structure formed to at least partially encapsulate the die stack.

In yet another form, there is provided a stacked die device and associated method of manufacture, assembly, and/or operation. The stacked die device includes a system board with a plurality of contact pads formed on a first surface, and a plurality of external conductors connected in a ball grid array (BGA) on a second opposite surface. The stacked die device also includes a conductor array electrically connected to the plurality of contact pads. In addition, an optical source die is electrically connected to the conductor array and attached to the system board. The optical source die includes a laser source for generating an unmodulated source light beam, and one or more optical routing structures for optically transmitting the unmodulated source light beam through the optical source die. A plurality of additional die are connected and attached to the optical source die in a die stack. Each additional die includes a modulator for generating an information-modulated optical signal from the unmodulated source light beam based on electrical signal information provided to said modulator, and one or more optical routing structures for optically receiving the unmodulated source light beam from the optical source die and transmitting the received unmodulated source light beam to the modulator. The stacked die device may also include a packaging structure attached to the substrate board that at least partially encapsulates the optical source die and the plurality of die formed in a die stack.

Although the described exemplary embodiments disclosed herein are directed to various high density, low power, high performance information systems in which a die stack includes an integrated optical communications are provided in a die stack in which a single laser light source or generator (e.g., laser diode) provides a source of monochromatic coherent unmodulated light to different optical modulators on the die stack using optical through silicon vias (TSVs) and optical mirrors and methods for making same, the present invention is not necessarily limited to the example embodiments which illustrate inventive aspects of the present invention that are applicable to a wide variety of fabrication processes and/or structures. Thus, the particular embodiments disclosed above are illustrative only and should not be taken as limitations upon the present invention, as the invention may be modified and practiced in different but equivalent manners apparent to those skilled in the art having the benefit of the teachings herein. For example, while the information system die stack features are described with example semiconductor process details for implementing various processor and memory die stack embodiments, this is merely for convenience of explanation and not intended to be limiting and persons of skill in the art will understand that the principles taught herein apply to other semiconductor processing steps and/or different types of integrated circuit devices. As a result, the various references to a processor die will be understood by those skilled in the art to refer to any processor, microprocessor, microcontroller, digital signal processor, audio processor, or other defined logic circuit and any combination thereof. Likewise, the various references to a memory die will be understood by those skilled in the art to refer to any memory die, such as DRAM, Flash, SRAM, MRAM, or other defined memory circuit and any combination thereof, and may also refer to a memory controller. Moreover, the thicknesses, materials, and processing details for the described layers may deviate from the disclosed examples. In addition, the terms of relative position used in the description and the claims, if any, are interchangeable under appropriate circumstances such that embodiments of the invention described herein are, for example, capable of operation in other orientations than those illustrated or otherwise described herein. The term "coupled," as used herein, is defined as directly or indirectly connected in an electrical or non-electrical manner. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus comprising:
 a first die comprising:
  a laser source for generating a source unmodulated optical beam, and
  one or more first optical beam routing structures for optically transmitting the source unmodulated optical beam through the first die; and
 at least one receiving die comprising:
  one or more second optical beam routing structures for optically receiving at least a portion of the source unmodulated optical beam from the one or more first optical beam routing structures,
  a modulator for generating an output modulated optical beam which is encoded at said modulator in response to electrical signal information, and
  one or more third optical beam routing structures for optically transmitting the output modulated optical beam signal through the receiving die.

2. The apparatus of claim 1, where the first die comprises a processor die, and where the receiving die comprises a memory die.

3. The apparatus of claim 1, where the first die and receiving die are attached together in a die stack module.

4. The apparatus of claim 3, where the one or more first optical beam routing structures comprise:
 a first optical beam waveguide for receiving the source unmodulated optical beam from the laser source; and
 a first optical mirror structure for receiving the source unmodulated optical beam from the first optical beam waveguide and deflecting the source unmodulated optical beam as a deflected source unmodulated optical beam toward the receiving die.

5. The apparatus of claim 4, where the first optical mirror structure comprises an angled interface deflection surface that is offset by 45 degrees from the lateral plane of the first die for perpendicularly deflecting the source unmodulated optical beam.

6. The apparatus of claim 4, where the one or more second optical beam routing structures on the receiving die comprise:
 a second optical through silicon via structure for receiving the deflected source unmodulated optical beam from the first die;
 a second optical mirror structure for deflecting the deflected source unmodulated optical beam from the second optical through silicon via structure as a second deflected source unmodulated optical beam toward a modulator on the receiving die; and
 a second optical beam waveguide for transmitting the second deflected source unmodulated optical beam to the modulator on the receiving die.

7. The apparatus of claim 6, where the one or more third optical beam routing structures on the receiving die comprise:
 a third optical beam waveguide for receiving the modulated optical beam signal from the modulator on the receiving die; and
 a third optical mirror structure for receiving the output modulated beam signal from the third optical beam waveguide and deflecting the output modulated optical beam signal toward the first die.

8. The apparatus of claim 1, where the first die and at least one receiving die comprise a first die and a plurality of receiving die attached in a die stack.

9. The apparatus of claim 8, further comprising a plurality of non-intersecting optical beam output routing structures for optically routing the output modulated optical beam signal from each receiving die to the first die.

10. The apparatus of claim 8, where the die stack is at least partially encapsulated by a packaging structure formed with mold compound.

11. The apparatus of claim 10, where the packaging structure is formed with a transparent mold compound.

12. The apparatus of claim 10, where the packaging structure comprises a transparent layer formed in the mold compound to provide a transparent output optical signal path from the packaging structure for an output modulated optical beam signal generated by the receiving die.

13. A method, comprising:
generating an unmodulated laser source light beam at a first die in a die stack;
transmitting the unmodulated source light beam to a modulator located at a receiving die in the die stack using one or more optical routing structures formed in the die stack; and
generating an information-modulated optical signal from the unmodulated source light beam at one of the one or more modulators based on electrical signal information provided to said one of the one or more modulators.

14. The method of claim 13, where generating the unmodulated source light beam signal comprises generating a source light beam of unmodulated monochromatic coherent light at a laser source formed in the first die.

15. The method of claim 13, where transmitting the unmodulated source light beam comprises transmitting the unmodulated laser source light beam through one or more optical beam waveguides, optical through silicon via structures, and optical mirror structures formed in the die stack to route the unmodulated source light beam from the first die to the modulator located at the receiving die.

16. The method of claim 13, where generating the information-modulated optical beam signal comprises generating the information-modulated optical beam signal based on electrical signal information produced by the receiving die in the die stack.

17. The method of claim 13, further comprising transmitting one or more information-modulated optical beam signals from the modulator to the first die using one or more output optical routing structures formed in the die stack.

18. The method of claim 17, where transmitting one or more information-modulated optical signals comprises transmitting one or more information-modulated optical beam signals through one or more output optical beam waveguides, output optical through silicon via structures, and output optical mirror structures formed in the die stack to route the one or more information-modulated optical signals to the first die.

19. The method of claim 13, further comprising transmitting one or more information-modulated optical beam signals from the one or more modulators through a packaging structure formed to at least partially encapsulate the die stack.

20. A stacked die device, comprising:
an optical source die electrically connected to the conductor array and attached to the system board, comprising a laser source for generating an unmodulated source light beam and one or more optical routing structures for optically transmitting the unmodulated source light beam through the optical source die; and
a second die connected and attached to the optical source die in a die stack, the second die comprising:
a modulator for generating an information-modulated optical signal from the unmodulated source light beam based on electrical signal information provided to said modulator, and
one or more optical routing structures for optically receiving the unmodulated source light beam from the optical source die and transmitting the received unmodulated source light beam to the modulator; and
a packaging structure attached to the substrate board that at least partially encapsulates the optical source die and the second die formed in a die stack.

* * * * *